United States Patent
Bauer et al.

(10) Patent No.: US 7,664,125 B1
(45) Date of Patent: Feb. 16, 2010

(54) INDICATION FORWARDING IN A DISTRIBUTED ENVIRONMENT

(75) Inventors: Andreas L. Bauer, Boxborough, MA (US); Gregory W. Lazar, Upton, MA (US); Ram Kailasanathan, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 740 days.

(21) Appl. No.: 11/324,740

(22) Filed: Jan. 3, 2006

(51) Int. Cl.
*H04L 12/24* (2006.01)
(52) U.S. Cl. .................................. 370/408
(58) Field of Classification Search ............... 370/218, 370/219, 220, 256, 408
See application file for complete search history.

(56) References Cited

U.S. PATENT DOCUMENTS

| | | | |
|---|---|---|---|
| 6,901,510 B1 * | 5/2005 | Srivastava | 713/163 |
| 7,007,040 B1 * | 2/2006 | Duke et al. | 707/200 |
| 7,457,914 B2 | 11/2008 | Cordella et al. | |
| 2002/0062388 A1 * | 5/2002 | Ogier et al. | 709/238 |
| 2003/0105649 A1 * | 6/2003 | Sheiner et al. | 705/2 |
| 2004/0019669 A1 * | 1/2004 | Viswanath et al. | 709/223 |
| 2004/0060006 A1 * | 3/2004 | Lindblad et al. | 715/513 |
| 2004/0196795 A1 * | 10/2004 | Yang | 370/254 |
| 2008/0133841 A1 * | 6/2008 | Finkler | 711/144 |

OTHER PUBLICATIONS

U.S. Appl. No. 09/877,862, Bauer, et al.
U.S. Appl. No. 09/965,430, Krishnan, et al.
U.S. Appl. No. 10/027,694, Nordin, et al.
U.S. Appl. No. 10/172,615, Bauer, et al.
U.S. Appl. No. 10/242,521, Dobberpuhl, et al.
U.S. Appl. No. 11/324,750, Bauer, et al.
U.S. Appl. No. 11/324,751, Bauer, et al.

* cited by examiner

*Primary Examiner*—Min Jung
(74) *Attorney, Agent, or Firm*—Muirhead & Saturnelli, LLC

(57) ABSTRACT

Described are techniques for performing indication forwarding. At an indication consolidator, a request is received from a client to receive indications about a plurality of nodes in accordance with first filter information. A communication structure for forwarding indications is determined. Subscription requests including said first filter information are forwarded from said indication consolidator to others of said plurality of nodes to establish communication connections between said plurality of nodes in accordance with said communication structure. Indications fired from any of said plurality of nodes in accordance with said first filter information are forwarded to said indication consolidator node in accordance with said communication structure. The client is notified of any indications received at said indication consolidator node in accordance with said first filter information.

20 Claims, 24 Drawing Sheets

```
<?xml version="1.0" ?><CIM CIMVERSION="2.0" DTDVERSION="2.0" >
<MESSAGE ID="877" PROTOCOLVERSION="1.0" >
<SIMPLEREQ><IMETHODCALL NAME="registerobserver" ><LOCALNAMESPACEPATH>
<NAMESPACE NAME="root" /><NAMESPACE NAME="emc" /><NAMESPACE NAME="navisphere" />
</LOCALNAMESPACEPATH>
<IPARAMVALUE NAME="CLASSNAME"><CLASSNAME NAME="EV_PSM" /></IPARAMVALUE>
<IPARAMVALUE NAME="ipaddress"><VALUE>128.221.34.80</VALUE></IPARAMVALUE>
<IPARAMVALUE NAME="portnumber"><VALUE>8081</VALUE></IPARAMVALUE>
<IPARAMVALUE NAME="ClientSessionId" TYPE="uint32"><VALUE>1429585450</VALUE></IPARAMVALUE>
<IPARAMVALUE NAME="FORWARD"><VALUE>TRUE</VALUE></IPARAMVALUE>
<IPARAMVALUE NAME="INDICATIONTYPE"><VALUE>Change</VALUE></IPARAMVALUE>
<IPARAMVALUE NAME="INDICATIONFILTER"><VALUE.ARRAY><VALUE>PSMState</VALUE>
</VALUE.ARRAY></IPARAMVALUE>
<IPARAMVALUE NAME="OBJECTNAME"><INSTANCENAME CLASSNAME="EV_PSM">
<KEYBINDING NAME="UniqueKeyFromObject" >
<KEYVALUE>^^EV^^0^^EV^^185^^EV^^F20005202308^^EV^^</KEYVALUE>
</KEYBINDING></INSTANCENAME></IPARAMVALUE></IMETHODCALL>
</SIMPLEREQ>
</MESSAGE>
</CIM>
```

FIGURE 12

```
<CIM CIMVERSION="2.0" DTDVERSION="2.0"><MESSAGE ID="0" PROTOCOLVERSION="1.0">
<SIMPLEEXPMSG><EXPMESSAGE NAME="ExportIndication">
<INSTANCE CLASSNAME="Navi_ChangeIndication">
<PROPERTY NAME="Instance"><VALUE.OBJECTWITHPATH>
<INSTANCEPATH><NAMESPACEPATH><HOST>10.14.12.40:443</HOST>
<LOCALNAMESPACEPATH><NAMESPACE Name="root" /><NAMESPACE Name="emc" /><NAMESPACE
    Name="navisphere" />
</LOCALNAMESPACEPATH></NAMESPACEPATH>
<INSTANCENAME CLASSNAME="EV_K10Subsystem"><KEYBINDING NAME="UniqueKeyFromObject">
<KEYVALUE VALUETYPE="string">^^EV^^0^^EV^^183^^EV^^F20005202308^^EV^^</KEYVALUE>
</KEYBINDING></INSTANCENAME></INSTANCEPATH>
<INSTANCE CLASSNAME="EV_K10Subsystem">
<PROPERTY NAME="Name" TYPE="string"><VALUE>40_41_Andy</VALUE></PROPERTY>
<PROPERTY NAME="WWN" TYPE="string"><VALUE>50:06:01:60:20:03:49:04</VALUE></PROPERTY>
....
</INSTANCE></VALUE.OBJECTWITHPATH></PROPERTY>
<PROPERTY.ARRAY NAME="ChangedItems" TYPE="string"><VALUE.ARRAY>
<VALUE>Name</VALUE><VALUE>UpdateTime</VALUE>
</VALUE.ARRAY></PROPERTY.ARRAY></INSTANCE>
</EXPMESSAGE></SIMPLEEXPMSG></MESSAGE></CIM>
```

FIGURE 13

INDICATION FORWARDING IN A DISTRIBUTED ENVIRONMENT

BACKGROUND

1. Technical Field

This application generally relates to distributed techniques, and more particularly to techniques used with information reporting in a distributed environment.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, management tasks may be performed in connection with one or more data storage systems. A management console or station may be used to monitor the data storage systems. The management console may be provided with updates or changes regarding the data storage systems, such as the occurrence of events. One existing technique used in connection with providing the updates to the management console system may include a data storage system reporting updates to the management console at regular periodic intervals. Certain information may be immediately reported to the management console based on its importance or severity rather than wait for the occurrence of a reporting interval.

The foregoing technique may have existing drawbacks. The reporting by each data storage system at each interval may consume an unacceptable amount of system bandwidth and other data storage system resources. The number of incoming messages to be processed by the single collection point, the management console, increases with the number of data storage systems and may eventually saturate or "flood" the management console and associated connection used for reporting. Additionally, reporting at periodic intervals means that any such reported information takes at least until the next interval to be communicated to the management console. Further, more time elapses before the management console completes processing the reports once they have been received. As a result, the total time which elapses between the occurrence of an event until that event is eventually received by a system manager at the management console may not be an acceptable amount of time. The management console may be displaying, for example, stale or outdated information or may be informed about an event within an unacceptable amount of time.

Rather than report information directly to the management console, another existing technique may utilize a publication/subscription service. In this technique, information is reported by the data storage systems to a server hosting the publication/subscription service. The server hosting the service polls the data storage systems for information at predetermined time intervals. The management console may register as a subscriber to be notified regarding events or other items of interest. Subsequently, the service sends the appropriate information to the management console as reported by the data storage systems. One drawback of the foregoing is that there is still a single point at which all data is collected and through which all notification are sent to subscribers. This may create a bottleneck in connection with a large amount of incoming reported data. The use of a single central point and server may not be scaleable in that there may not be sufficient network bandwidth or computer processing capabilities available as the number of data storage systems, devices, and/or reported information increases. For example, the number of incoming messages reporting information increases with the number of data storage systems and may eventually saturate or "flood" the server and associated network used for reporting. Additionally, there needs to be some provision in the foregoing in the event the central single point experiences a failure.

Thus, it may be desirable to have an efficient technique for reporting events and updates regarding one or more data storage systems in a timely manner. It may be desirable that the technique be scalable for use with a varying number of data storage devices and events occurring therein.

SUMMARY OF THE INVENTION

In accordance with one aspect of the invention is a method for performing indication forwarding comprising: receiving, at an indication consolidator, a request from a client to receive indications about a plurality of nodes in accordance with first filter information; determining a communication structure for forwarding indications, said communication structure including said plurality of nodes corresponding to entities forwarding indications to a said indication consolidator node; forwarding subscription requests including said first filter information from said indication consolidator to others of said plurality of nodes to establish communication connections between said plurality of nodes in accordance with said communication structure; forwarding indications fired from any of said plurality of nodes in accordance with said first filter information to said indication consolidator node in accordance with said communication structure; and notifying said client of any indications received at said indication consolidator node in accordance with said first filter information. Each node may include a plurality of processors, and the method may further include performing for each node: designating a first of said plurality of processors to be an active processor and the remaining of said plurality of processors being designated as inactive; and if the active processor becomes unavailable and another of said plurality of processors is available, selecting said other of said plurality of processors as said active processor for said each node. The communication structure may form a tree in which each parent node subscribes to indications from its children. If a node other than said indication consolidator node is determined as a failing node, a replacement node may be determined by selecting one of the children, if any, of the failing node. The communication structure may be adjusted so that any remaining children of said failed node are children of said replacement node. The method may also include adjusting subscriptions for indications so that said children of said failed node fire indications to said selected node. Each parent node may perform lightweight polling of its children at predefined time intervals to determine if it has connectivity over a communication connection with each of its children. If the parent node determines that an active processor of its child becomes unavailable and another of said plurality of processors is available, the parent node may select another of said plurality of processors as said active processor for said child node. If the client determines that the indication consolidator is unavailable, the method may also include selecting another one of said plurality of nodes as said new indication consolidator node; and forwarding any previously undeliverable indications designated for said indication consolidator node to said new indication consolidator node. Each node may forward indications from any of its descendant nodes to a parent of said each node in accordance with said communication structure. The indications may correspond to one or more of events, a metric associated with an entity on a node, a property associated with an entity on a node, and an alert. Each node may perform event reporting about events on said each node in accordance with a same filter.

In accordance with another aspect of the invention is a computer program product for performing indication forwarding comprising code that: receives, at an indication consolidator, a request from a client to receive indications about a plurality of nodes in accordance with first filter information; determines a communication structure for forwarding indications, said communication structure including said plurality of nodes corresponding to entities forwarding indications to a said indication consolidator node; forwards subscription requests including said first filter information from said indication consolidator to others of said plurality of nodes to establish communication connections between said plurality of nodes in accordance with said communication structure; forwards indications fired from any of said plurality of nodes in accordance with said first filter information to said indication consolidator node in accordance with said communication structure; and notifies said client of any indications received at said indication consolidator node in accordance with said first filter information. Each node may include a plurality of processors, and the computer program product may further include code for performing the following for each node: designating a first of said plurality of processors to be an active processor and the remaining of said plurality of processors being designated as inactive; and if the active processor becomes unavailable and another of said plurality of processors is available, selecting said other of said plurality of processors as said active processor for said each node. The communication structure may form a tree in which each parent node subscribes to indications from its children. If a node other than the indication consolidator node is determined as a failing node, a replacement node may be determined by selecting one of the children, if any, of the failing node. The communication structure may be adjusted so that any remaining children of said failed node are children of said replacement node, and the computer program product may further include code that: adjusts subscriptions for indications so that said children of said failed node fire indications to said selected node. Each parent node may include code that performs lightweight polling of its children at predefined time intervals to determine if it has connectivity over a communication connection with each of its children. If the parent node determines that an active processor of its child becomes unavailable and another of said plurality of processors is available, the parent node may select another of said plurality of processors as said active processor for said child node. The computer program product may also include code that, if the client determines that said indication consolidator node is unavailable, selects another one of said plurality of nodes as said new indication consolidator node; and forwards any previously undeliverable indications designated for said indication consolidator node to said new indication consolidator node.

BRIEF DESCRIPTION OF THE DRAWINGS

Features and advantages of the present invention will become more apparent from the following detailed description of exemplary embodiments thereof taken in conjunction with the accompanying drawings in which:

FIGS. 11, 12 and 13 are examples of the messages that may be used in connection with the techniques described herein;

DETAILED DESCRIPTION OF EMBODIMENT(S)

Figure 1:
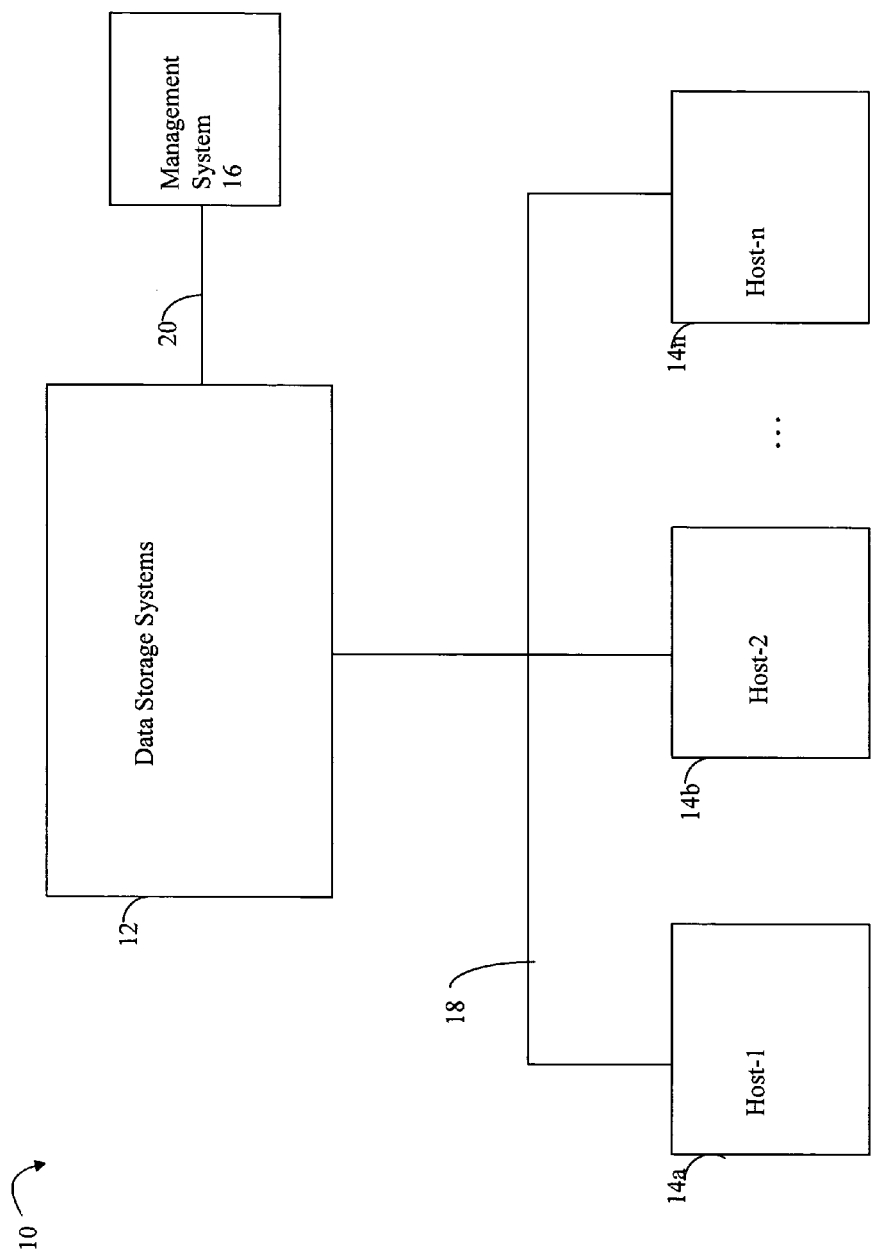
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

As will be described in more detail herein, the management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. Techniques that may be used in connection with data storage system management are described in more detail elsewhere herein.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

Figure 2:
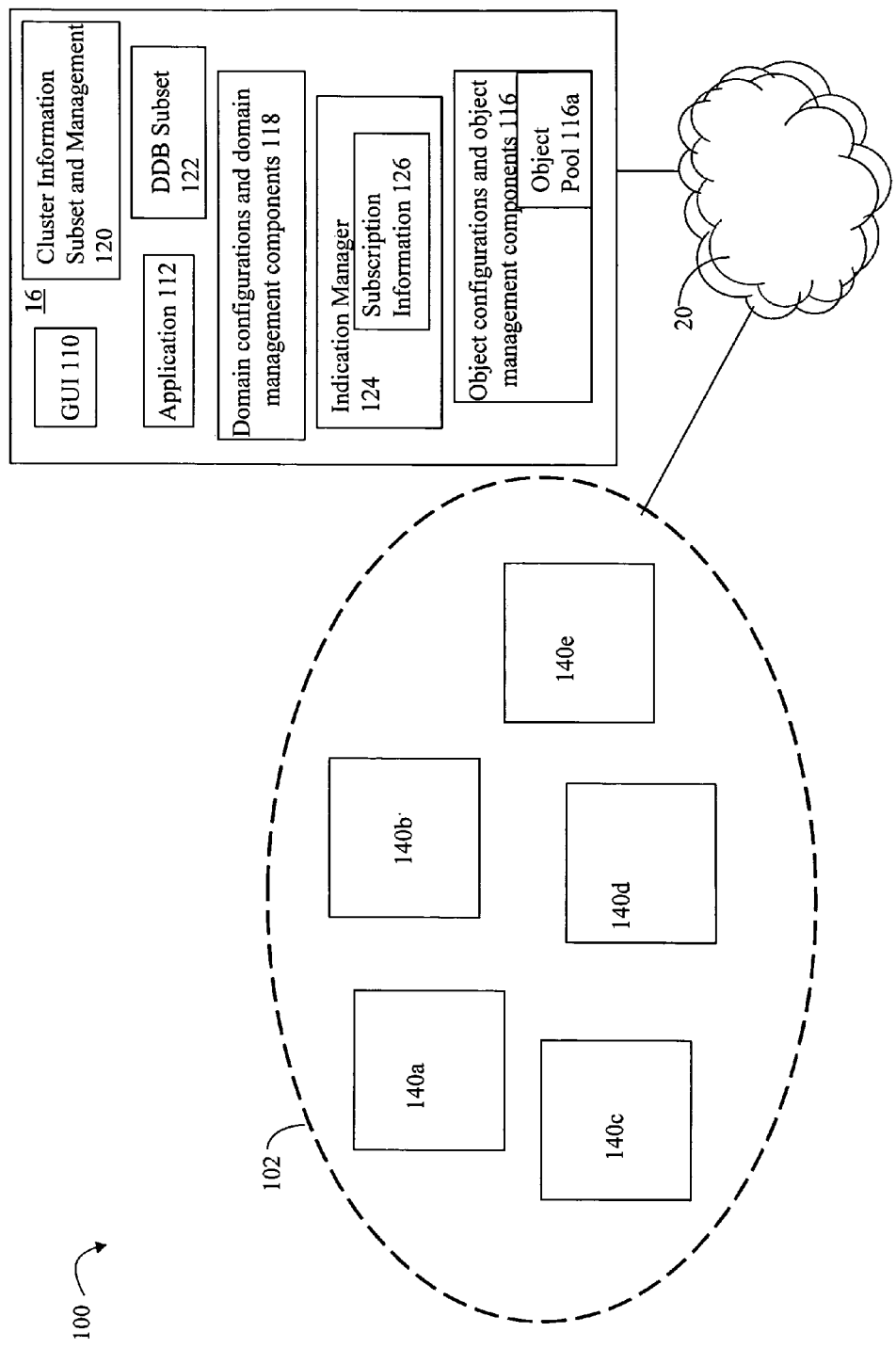
FIG. 2 is an example of an embodiment of components of FIG. 1 in more detail as may be used in connection with techniques described herein.

Referring now to FIG. 2, shown is an example 100 of components that may be used in connection with techniques described herein. Included in the example 100 are domain 102, components that may be included in the management system 16, and communication connection 20. A domain may be defined as a functionally bounded set of interconnected components, such as data storage systems, that communicate and/or cooperate for a common purpose. The particular data storage systems included in a domain may be user-configured. In connection with the techniques described herein, a user may want to perform operations for data storage system management at the domain level (e.g., for the data storage systems included in a domain). Thus, a user may accordingly configure one or more domains. In this example, one domain 102 is specified although an embodiment may include a varying number of one or more domains. The domain 102 may be configured to include one or more data storage systems. The domain 102 includes data storage systems 140a-140e.

The components of the management system 16 may include a graphical user interface (GUI) 110, one or more applications 112, object configurations and object management components 116, domain configurations and domain management components 118, a directory database (DDB) subset 122, an indication manager 124, and a cluster information subset and management component 120.

The GUI 110 may be used in connection with interfacing with a user, such as a data storage system manager. The GUI 110 may be used to obtain input in connection with inquiries to be made regarding one or more domains. The GUI 110 may also be used in connection with displaying output, for example, in response to obtaining information for requested inquiries regarding the one or more domains. The GUI 110 may be used in connection with one or more applications 112 for performing system management of the data storage systems included in domain 102.

The domain configuration and domain management components 118 may be used in connection with storing information about what nodes are included in each configured domain. If changes are made to a domain configuration such as, for example, in connection with the addition and/or removal of a data storage system, domain management components may accordingly update the configuration of the affected domain(s). One embodiment of a domain and supporting components of 118 as may be included in the management system 16 is described in more detail in U.S. patent application Ser. No. 10/242,521, entitled "ROBUST INDICATION PROCESSING FAILURE MODE HANDLING", filed on Sep. 12, 2002, assigned to EMC Corporation, which is incorporated by reference herein. It should be noted that the foregoing U.S. patent application Ser. No. 10/242,521 also includes components and describes processing as may be included in a system specifying a failover processor for each data storage system. In the foregoing application incorporated by reference, each data storage system includes multiple processors forming a cluster. Only one of the processors is designated as active at any time. Techniques are further described in connection with maintaining communication with a designated active one of the cluster's processors and designating another of the cluster's processors in the event an active processor fails or is otherwise not available for use. An embodiment is described in more detail elsewhere herein utilizing such a node having multiple processors with the associated node failover functionality.

The object configurations and object management components 116 may be used in connection with management of objects associated with the data storage systems of domain 102. As described herein, an object may refer to an entity commonly used in connection with object oriented programming. An embodiment of an object may be defined as a data container including data and/or instructions to be used in connection with accessing a particular object. In connection with the techniques described herein, an object may be associated with an entity in a domain for monitoring or observing a component such as in connection with the management of data storage systems. An object may be associated with a hardware or software entity such as, for example, an application executing on a server, a LUN (logical unit), disk, port, fan, and the like. The entity may be a physically or a logically defined entity as may be included in a node of the domain.

The element 116 may include an object pool 116*a* representing a subset of all objects that may be defined for a given system, such as illustrated herein. The contents of the object pool may vary in accordance with the particular operations being performed by the GUI 10. Information about each of the objects may be stored on each node for which the object is defined. In other words, each node includes information about its own objects. The particular subset of objects included in the object pool may vary in accordance with the operation performed via the GUI since the object pool is used in facilitating GUI operations. For example, if the user is performing an operation to view objects defined for a first data storage system, the object pool may include that subset of objects defined for the first data storage system. If the user subsequently views objects defined for a second different data storage system, the object pool may be updated to include a different subset of objects defined for the second data storage system.

The element 116 may represent collectively the components for maintaining and management of the object pool 116*a*. The object management components included in 116 may handle management of the foregoing object pool including, for example, retrieving updated information about which objects are defined for a node at the time of a user selection. The components in 116 may retrieve such information and maintain the lists of objects defined for each node using any one or more different techniques. In one embodiment, an inquiry may be sent to each node requesting a list of all objects when needed such as, for example, when the user is defining groups and requests a list of objects defined for a particular node.

In one embodiment, a user may view objects of one or more data storage systems in connection with performing a variety of different operations such as for display and selection. Tables or lists of objects defined for each node as used by the GUI may be stored in the object pool 116*a* during the foregoing displaying and selecting as may be associated with GUI operations.

Entities in the data storage systems may be monitored through their associated subject objects. A subject object may change state in accordance with any changes of an associated entity. When a subject object changes state, the subject object fires back an indication to an interested observer or observer object. The subject object may be referred to as the indication source and the indication is the message sent by the subject object to an observer object indicating a change has occurred. The observer may also be characterized as an indication subscriber or client. The client, which may be on the same system or a remote system connected thereto, may subscribe to one or more services included in a node of the domain to receive such indications. The indication subscription is the request for the indication or state change message. The subject objects may be stored on each data storage system and may be used for sending indications to subscribers. Components in the management system 16, such as the GUI 110, may be one such client or indication subscriber. The foregoing firing of indications may be characterized as asynchronous notification, in contrast to other techniques such as polling, in which interested subscribers receive notification in the form of indications for changes of interest. Described in following paragraphs are techniques for management of the foregoing indications in a distributed manner.

It should be noted that the indications reported to a subscriber may be in accordance with a subscriber specified filter. In other words, the subscriber may specify which particular indications are of interest through the use of a filter. The filter may be specified in the subscription request. The server may accordingly only forward indications to a subscriber for items of interested as indicated in the filter. The types of filters as may be included in an embodiment are described in more detail herein.

It should be noted that the indication techniques described herein may be used in connection with forwarding a variety of different types of information and in connection with a variety of different subscriptions and services. These may include, for example, events, alerts, and changes of metrics. In one aspect, changes of metrics, events and alerts form a hierarchy, in order of increasing granularity. Each of the foregoing may have a different corresponding service to which another service, application, and the like, in any node or the component 16 may subscribe for indications. The metric service may fire indications about changes with respect to individual metrics as may be associated with objects such as, for example, when a particular metric or other property of a corresponding physical or logical entity changes. A subscriber to a metric service may be an event service. The event service may include event objects which fire indications about events such as when the physical or logical entity enters a particular state (e.g., as may be indicated by the metric service). As an example, the metric service may generate an indication when a device changes state from available to unavailable, or vice versa. The event service may generate an indication about events such as, for example, when a metric or property as reported by the metric service enters the state of unavailable. The event service may accordingly send an indication of the event to an alert service which is a subscriber of the event service. The alert service may include alert objects which fire alert indications, such as output information to a user at the management system 16, when the alert service receives an event indication of the device's state change to unavailable. Each service includes objects of a particular kind in accordance with the service. For example, the event service has instances of event objects each corresponding to different events. Each such event object fires indications in accordance with a requested event to particular subscribers. The GUI of the management system 16 may subscribe to indications of the alert service included in one of the nodes. The indication techniques and use with metrics or properties, events and alerts are described in more detail herein.

The DDB subset 122, as included in the management system 16, may be used in connection with facilitating communication between elements in the domain in connection with techniques described herein. The DDB subset 122 may be a subset of the entire persistent DDB as may be stored on each node of the domains. As illustrated in connection with other figures herein, the DDB may be distributed throughout the entire network and included in each node of the domain. The DDB may be characterized as a generic directory of persistently stored data which is maintained and recoverable, for example, in the event of a power failure. Each node included in the domain may have an address or associated entry in the DDB. A first node wishing to communicate with another node in the domain may obtain the address layout or other information in order to communicate with the other node from the DDB. The DDB may be viewed as a database of address listings for entities in an embodiment. The particular entities listed may vary with each embodiment but may include address information for all nodes in a domain. Addresses may also be included in the DDB for other entities as may be included and used in an embodiment. In one embodiment, all nodes may mount a shared drive accessing a file or other data container including a common set of directory information as may be held in a single central location. Another embodiment of the DDB is described in U.S. patent application Ser. No. 09/965,430, filed Sep. 27, 2001, entitled "MANAGING A DISTRIBUTED DATABASE CACHE", which is incorporated by reference herein. As will be appreciated by those skilled in the art, other embodiments of a DDB may be used in connection with the techniques described herein. The DDB may be used in facilitating reporting of information using the indication forwarding techniques described in more detail in following paragraphs.

The particular subset of the DDB 122 included in 16 may vary in accordance with the particular operations performed by the GUI 110 since the element 122, along with 116a, may be used to facilitate GUI operations.

Indication manager 124 performs functionality similar to that as described in U.S. patent application Ser. No. 10/242,521. The indication manager 124 stores information about subscriptions for indications 126 by the management system 16. The indication manager 124 receives incoming indications and forwards them to the proper subscriber. The indication manager 124 also performs the operations associated with unsubscribing a client, such as when a session ends, or with resubscribing a client, such as when a node or processor within a node goes down, and the client is a component such as the GUI 110. The indication manager 124 also performs communication in initially establishing subscriptions as may be made via a request from the GUI 110 or other component of 116.

The cluster information subset and management components 120, as included in the management system 16, may be used in connection with facilitating communication between elements in the domain and the system 16 with techniques described herein. The element 120 may collectively represent the subset of cluster information and associated management components. The cluster information subset included in 120 may be a subset of the entire persistent set of cluster information as may be stored on each node of the domain. As illustrated in connection with other figures herein, the cluster information may be distributed throughout the entire network and included in each node of the domain. The cluster information may be characterized as a directory of cluster information that is persistently stored on each node in the domain. The subset of cluster information included in 120 may be in accordance with the particular operations performed by the management system 16. The cluster information stored on each node may be persistently stored similar to the DDB as also described herein. Other techniques may be used in an embodiment in connection with making this information persistently available to the nodes.

Management components, as included in element 120 for managing cluster information as may be used by the system 16, may perform functionality similar to that as described in U.S. patent application Ser. No. 10/242,521. As mentioned above, in one embodiment, each data storage system corresponding to a node may include two processors forming a cluster. In the cluster of each node, a first processor is active and a second processor is inactive. The second inactive processor may become active in the event that the first processor is unavailable for performing its processing. In one aspect, each processor of a same data storage system may be characterized as a peer processor. The cluster management components of 120 may keep track of which processor in each cluster is currently active. Each processor in the cluster has an associated IP address which is also stored by 120. As described elsewhere herein, one of the nodes in the domain may determine that a processor is down and notify the management console 16 causing the component 120 to update its information. When the components of 120 are notified that a processor within a node has gone down, the cluster management components of 120 informs the indication manager 124 so that the indication manager 124 may perform any necessary resubscriptions to the alternate peer processor in the node. In the event an entire node or both processors within a node are unavailable, the indication manager 124 may send a message to the client, such as the GUI 110, indicating termination of the subscription as well as other processing as will be described herein. In one embodiment described herein, the burden is on the subscriber to detect any problems regarding communication with the publisher or provider of the indications. This is described in more detail herein. The cluster management components of 120 may use a technique referred to herein as heartbeating in monitoring communications to selected nodes. The particular connection from the system 16 to a node and the use of heartbeat messages are described in more detail in following paragraphs.

The data storage systems included in the domain 102 may be, for example, data storage systems as manufactured by a single vendor such as EMC Corporation. An embodiment may also include data storage systems from multiple vendors. These, and other particulars described herein for the purposes of example and illustration should not be construed as a limitation of the techniques. The data storage systems included in the domain 102 and the management system 16 may communicate through the communication connection 20. In this example, the connection 20 may be a network connection although other types of connections may be used. The particular type of communication paths may vary in accordance with each embodiment. For example, the communication path used in connection with data storage management may also include a switching fabric. The types of connections used for data storage system management and/or I/O may include, for example, a fibre channel, SCSI, or other communication connection.

It should be noted that the particular one or more components that may be included in the management system 16 may vary with each particular embodiment. As described elsewhere herein, the management system 16 may include, for example, a computer system which has a processor and a display device. The processor may execute instructions to display information about the storage system to a storage system manager. Software executing on the computer system of the management system 16 may also be used in connection with obtaining user input, such as may be obtained from the data storage system manager in connection with monitoring data storage systems.

The number and type of components included in management system 16 may vary with the complexity of the storage system as well as the particular applications and tasks performed in an embodiment. For example, management system 16 may include only a single computer system or processor with a single display device. Alternatively, an embodiment may require greater complexity in connection with management of the data storage system. Thus, the management system 16 may also include additional software and/or hardware It should be noted that in the embodiment described herein, no data used in connection with the techniques described herein is stored persistently on the management system. Rather, such information may be stored persistently on the nodes.

Techniques will now be described in connection with data storage system management as may be used in connection with one or more data storage systems in an embodiment of the computer system 10 of FIG. 1.

A user at a GUI of the management system 16 may be notified of the occurrence of certain events that may occur in the data storage systems of a domain, such as domain 102. Asynchronous notification may be used in a distributed fashion to so notify the user. The GUI may receive an indication from a single node in the domain regarding all indications from all nodes in the domain. The single node may be characterized as a centralized point for domain indications and may be referred to herein as an indication or subscription consolidator for all indications collected for the domain. For example, in one embodiment, the GUI may receive notification of one or more events occurring in the data storage systems of the domain 102. These events may be reported in the form of indications from the indication consolidator. The indication consolidator may be selected using any one of a variety of techniques. The user may select the indication consolidator. The indication consolidator may be specified, by manual selection or through automated determination by executing code, in accordance with one or more static and/or dynamic heuristics, such as in connection with load balancing for nodes in the domain. In one embodiment, the indication consolidator asks other nodes in the domain to report to it any event indications occurring on their respective nodes. In the foregoing, the GUI 110 of the management system 16 may registers as an indication subscriber of the indication consolidator. It should be noted that the indication consolidator may be characterized as a role that may be assumed by any node in the domain. As an example that is described elsewhere herein in more detail, the indication consolidator may change if the selected indication consolidator node fails.

In one embodiment, the indication consolidator may utilize a technique referred to as indication forwarding in connection with collecting the indications for the domain. The indication forwarding may utilize the communication tree produced using techniques described in U.S. patent application Ser. No. 09/877,862, filed on Jun. 8, 2001, entitled SCALABLE COMMUNICATION WITHIN A DISTRIBUTED SYSTEM USING DYNAMIC COMMUNICATION TREES, which is incorporated by reference herein. The indication consolidator may form the communication tree as described U.S. patent application Ser. No. 09/877,862 and use this communication tree as the subscription tree for indication reporting. The communication tree is used to set up indication subscriptions between the nodes and is subsequently used for forwarding the indications up the tree to the root. The indication consolidator may utilize this communication tree for the duration of the session by the GUI, for example. The communication tree defines the routes or paths by which reported information is asynchronously communicated up the tree to the indication consolidator which is the root of the communication tree. Indication forwarding utilizes the communication tree structure in which the nodes of the tree are analogous to nodes of the domain. The indication consolidator forwards indication subscription requests down the tree toward the leaf nodes by instructing each node in the next level to similarly forward indication subscription requests. Thus, the communication tree defines the communication structure used to forward or push indications up the tree to the root node. The indication consolidator requests each node in the next level to collect indications from any of its child nodes and forward such indications, along with any indications by the node, up the tree to the indication consolidator. Similarly, a node at each level in the tree forwards any indication requests from its descendant nodes in the tree to the node's parent. The foregoing indication forwarding is performed so that indications are reported from the leaf nodes to their respective parent nodes. Each of the respective parent nodes collects indications from all its child nodes and forwards the collected indications to its respective parent. This process continues until the root node is reached. The root node, the indication consolidator, then forwards any indications to the GUI. In one embodiment, each parent node subscribes to receive indications from its child nodes. The child nodes function as indication providers, publishers, or servers of indications to parent nodes. The parent nodes function as clients, subscribers, or indication recipients of their child nodes. Thus, each node which has one or more child nodes and also a parent node functions as both a publisher and a subscriber of indications.

It should be noted that the foregoing subscription tree is dynamic in that it can be adjusted in accordance with nodes that may be added to the domain, or may fail or otherwise be unavailable. This is described in more detail herein in connection with failover techniques.

Using the foregoing indication forwarding technique with the communication tree as described in U.S. patent application Ser. No. 09/877,862, each node in the domain has connectivity to every other node in the domain. The respective addresses of nodes in the domain may be included and maintained in the DDB as illustrated in various figures herein. One embodiment for managing the DDB is described in more detail in U.S. patent application Ser. No. 09/965,430, filed on Sep. 27, 2001, entitled MANAGING A DISTRIBUTED DIRECTORY DATABASE, which is incorporated by reference herein.

In an embodiment in which each node in the domain has connectivity to every other node in the domain, any one of the nodes may be selected as the indication consolidator node and the communication tree may be used for subscriptions in connection with indication forwarding.

Figure 3:
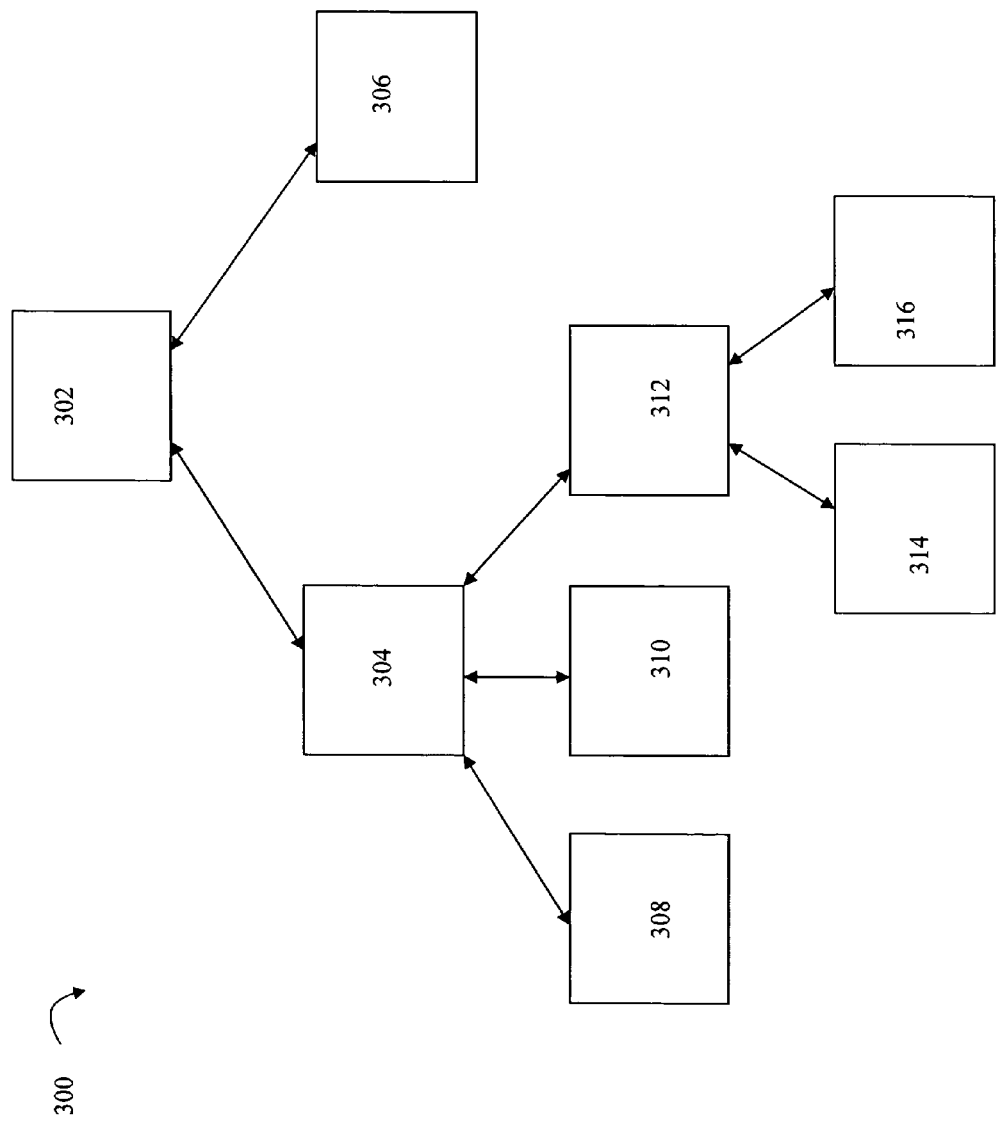
FIGS. 3 and 4 are examples of communication structures that may be used in connection with the indication forwarding techniques described herein.

Referring now to FIG. 3, shown is an example of the communication tree as may be used in connection with indication forwarding. The root node 302 may be the indication consolidator node to which a component (e.g., the GUI 110) of the system 16 subscribes. In one embodiment, the node 302 constructs the communication tree and uses this as the indication forwarding communication structure for the duration of the session with the system 16. The system 16 is registered as a subscriber of events on node 302. The node 302 sends subscription requests to its child nodes, 304 and 306, to send indications about each of the nodes 304 and 306 to 302. Node 302 subscribes to indications on nodes 304 and 306. Additionally, node 302 instructs 304 to send subscription requests for indications to each of 304s child nodes (e.g., 308, 310 and 312), so that node 304 subscribes to indications from its children. Node 304 instructs its child node 312 to send subscription requests for indications to each of 312's child nodes (e.g., 314 and 316) so that node 312 subscribes to indications from its children. The foregoing subscriptions are established and used as a communications framework for reporting indications up the tree through the various levels of subscribers (e.g., from leaf nodes to the root node). Any node reports to its parent of any local indications as well as any indications received from its descendant nodes.

In one example use of the structure of FIG. 3, each of the subscriptions may be made with respect to event queues. Node 302's local event queue includes events from node 302 and subscribes to events from its children's local event queues (e.g., through node 302's subscriptions to its children's event queues). Node 304's local event queue includes events from node 304 and subscribes to events from its children's local event queues (e.g., through node 304's subscription to its children's event queues). Node 312's local event queue includes events from node 312 and subscribes to events from its children's local event queues (e.g., through node 312's subscription to its children's event queues).

In an embodiment in which the nodes in the domain do not have connectivity to other nodes, an alternate technique may be used. The indication consolidator node selected may have connectivity to each of the other nodes in the domain individually but the other nodes in the domain may not have connectivity to each other. In this instance, the indication consolidator node may collect or gather the indications from each other node in the domain. In other words, the indication consolidator may subscribe to receiving indications directly from each node in the domain. In one aspect, a tree of level 1 is used in which the indication consolidator is the root node, all other nodes in the domain are leaf nodes, and all indications are sent directly from the leaf nodes to the root node.

It should be noted that the particular tree or structure used in an embodiment may be a variation of what is illustrated in FIG. 3. In one embodiment, the subscription tree may be constructed in accordance with the property with respect to nodes at each level of the tree in which a node to the left of another node at the same level (e.g., sibling nodes) has the same number or more children than another node to its right at the same level. As an example of this variation with reference to FIG. 3 in such an embodiment, the node 308 may have nodes 314 and 316 as its children rather than node 312. The illustration in FIG. 3 may represent a subscription tree or structure having a property with respect to nodes at each level of the tree in which a node to the right of another node at the same level has the same number or more childer than another node to its left at the same level.

Figure 4:
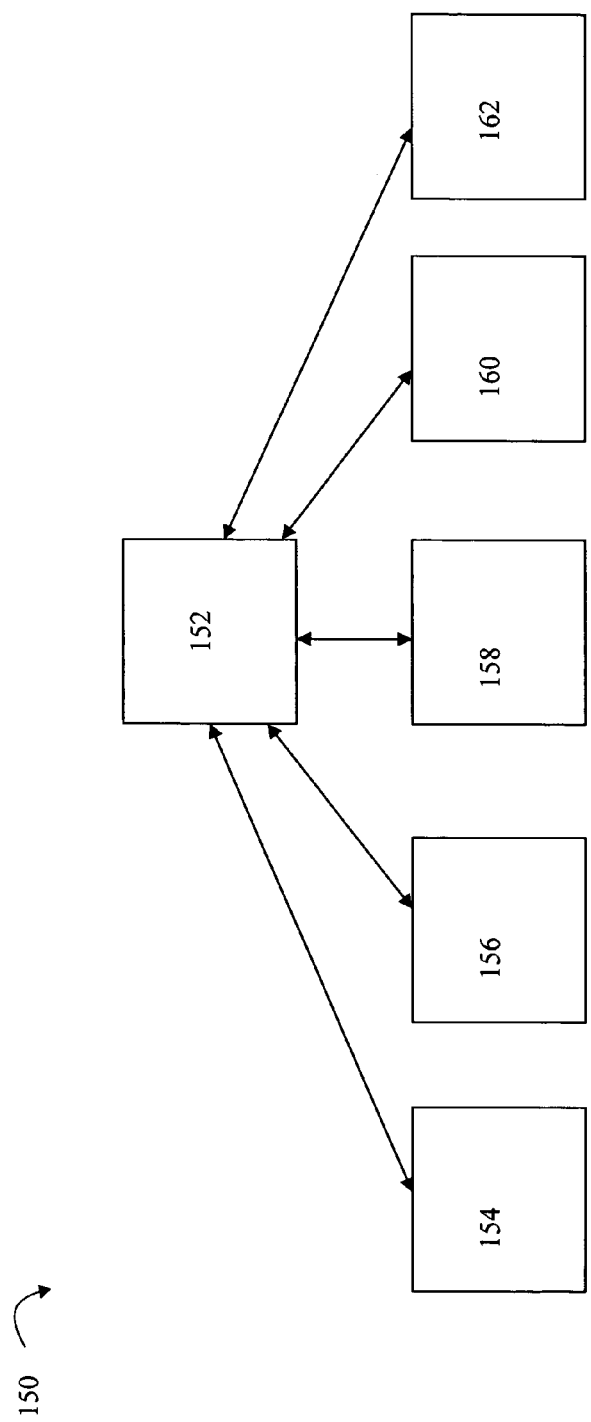

Referring now to FIG. 4, shown is an example 150 of an alternative communication structure as may be used in connection with indication forwarding. Rather than produce and utilize the structure as illustrated in FIG. 3, the selected indication consolidator may generate the alternative communication tree structure illustrated in 150. The root node 152 is the indication consolidator which subscribes to indications on every other node in the domain. The same techniques used in connection with the structure of FIG. 3 may also be used in connection with the structure of FIG. 4.

It should be noted that the indication consolidator node may be a data storage system or it may be another computer system such as a personal computer even though a data storage system may described herein for purposes of illustration.

An embodiment using the foregoing communication tree as illustrated in FIG. 3 or 4 as the communication infrastructure or template for indication forwarding may further utilize techniques described in U.S. patent application Ser. No. 10/242,521. An embodiment may use the persistent pipes as described in the foregoing for communication between nodes in the tree, and for communication between the management system 16 (e.g., GUI 110) and the indication consolidator node. As described in more detail in U.S. patent application Ser. No. 10/242,521 and its parent application, U.S. patent application Ser. No. 10/172,615, "Robust Indication Processing" filed on Jun. 14, 2002, which is also incorporated by reference herein, the persistent pipes are TCP/IP connections in which particular ports are bound. An embodiment may also use other connections to facilitate communications between nodes of the domain, such as ordinary TCP/IP connections. However use of non-persistent connections may have indications fired-back running the risk of failed communication.

The use of the communication tree of FIG. 3 or 4, persistent pipes, and dual processors or cluster at each node may be used in connection with providing a robust and efficient arrangement for indication forwarding in a distributed fashion. It should be noted that although an embodiment may utilize all the foregoing, an embodiment may use any combination of the foregoing.

Each subscriber may be responsible for monitoring and maintaining the status of connections to its publishers or providers of indications. Regarding the communication tree, each parent node may be responsible for monitoring and maintaining the status of connections to its children. In one embodiment, this may be performed by the parent node, at defined intervals, sending a heartbeat request to its child nodes. The child node may respond by sending a return message to the parent over the connection used for indication forwarding. Thus, the parent node may ensure that the child node is available and functioning and that the communication connection is also functional. Heartbeating is light polling and is described in more detail in U.S. patent application Ser. No. 10/242,521, and its parent application.

The use of heartbeat messages may also be used by the components of 120 of the system 16 in monitoring the connection to the selected indication consolidator node as mentioned above. In the event that the system 16 determines that the indication consolidator node has gone down or is otherwise unavailable, the system 16 may select a new indication consolidator and subscribe to receive indications from the new indication consolidator. With reference to FIG. 2, changes to the domain, such as removal of an indication consolidator node from the domain, are reported to component 118 which in turn notifies cluster management components of 120. The cluster management components of 120 may then notify the indication manager 124 of the removal of the indication consolidator node so that the indication manager may take steps to interact with the GUI to obtain a new indication consolidator. The indication manager 124 may then resubscribe for all indications on the new indication consolidator node. The cluster management components of 120 may also notify the indication manager 124 if there is a failover to another processor in the indication consolidator node's cluster as may be performed in response to a failure of an active node to respond to a heartbeat message (e.g., a change in which processor is designated as the active processor in each node). The indication manager 124 may then resubscribe for all indications of the new active processor of the indication consolidator node.

In connection with the use of persistent pipes, communications between the system 16 and the indication consolidator, or between any two nodes, may fail because of problems with the communication connection or because of problems at one of the connection endpoints, such as a down processor or entire node. On the management system 16, a problem with the communications may be detected if the cluster management components of 120 receive a TCP/IP message indicating the TCP/IP pipe connection has been reset. The cluster management components of 120 may also detect a pipe disconnection if a heartbeat message fails. Additionally, the cluster management components of 120 may also detect pipe disconnection if the heartbeat response includes a change in session id relative to previous heartbeat responses (e.g., indicating a new instance of the active node is running). As also described above, the removal of an indication consolidator node from the domain may also be reported by the component 118.

If the parent node determines that it is unable to communicate with one of its child nodes, the parent node may perform several tasks. The parent node may update the cluster information as maintained on each node in the cluster to reflect that the particular processor with which it has communicated, the active processor, is down. This may include, for example, indicating this processor as passive (e.g., not the active processor in the cluster for that node) and that the processor is also inoperative. The parent node may also attempt to establish communications to the other passive peer processor. The parent node may utilize information in the DDB and cluster information stored persistently at each node in performing this operation. For example, the parent node may send a heartbeat message to the passive peer processor of its child node. If the heartbeat is successful, the parent node may designate the peer processor as the newly active processor for its child node. The parent node may then update the cluster information to indicate this.

In the event that there is an entire node failure and communications cannot be established with any processor in an embodiment with nodes having multiple processors, the particular steps taken may vary with the communication structure used for indication forwarding. In an embodiment using the communication tree of FIG. 3, the parent node may select a first child of the down node (e.g., a grandchild of the parent node) to assume the role of the down node in the tree. The remainder of the children of the down node (e.g., the selected first child node) now become children of the selected first child node. The parent node may monitor the status of the down node by executing a thread process issuing heartbeat messages to each of the processors of the down node. When one of the processors of the down node responds to the heartbeat message, the parent node may add the previously down node back into the tree as a child of the node which replaced the down node. The foregoing will now be illustrated in connection with figures herein.

If the failed or down node does not have any child nodes (e.g., the down node is a leaf node), the parent node may execute a thread process issuing heartbeat messages to the down node to monitor the status of the down node. When one of the processors of the down node responds to the heartbeat message, the parent node may add the down node back into the tree in its original location. The forgoing may also be performed in an embodiment using the structure of FIG. 3 if the down node is a leaf node. Additionally, the foregoing may be used in connection with the embodiment of FIG. 4 since all nodes in the domain other than the indication consolidator node are leaf nodes.

Figure 4A:
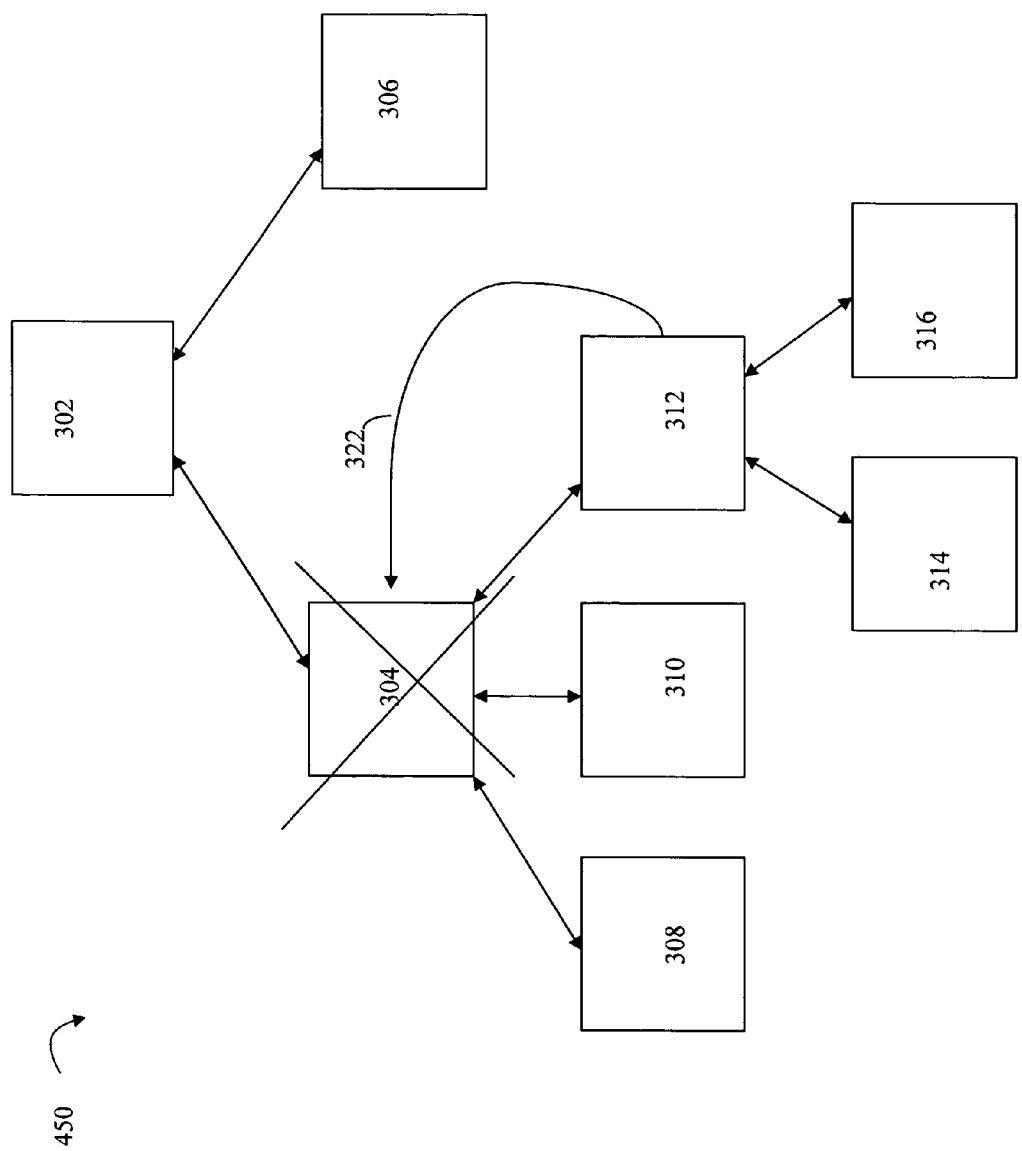
FIGS. 4A-4B illustrate node failover processing performed by a parent node determining one of its children has failed.

Referring now to FIG. 4A, shown is an example of a communication tree as illustrated in FIG. 3. Failover processing will now be described. There are two aspects to failover processing. In one aspect, the entire node may be unavailable. In another aspect, one processor within a node may be unavailable but its peer processor in the cluster at the same node may be available. With reference to FIG. 4A, the node 302 may detect that the current active processor of node 304 has become unavailable. Node 302 will attempt to communicate with node 304's inactive peer processor. If a connection can be made to the peer processor, node 302 will resubscribe to the peer processor of node 304. If, however, node 302 is unable to successfully establish a connection with 304's peer processor, node 302 selects one of node 304's children to assume the role of 304 in the tree structure. In the example 450, node 302 selects node 312 to fulfill the role of node 304. Node 302 then sends a subscription request to node 304. Node 304 then sends subscription requests to nodes 308 and 310. Node 304 also sends subscription requests to nodes 314 and 316. The resulting structure is illustrated in 480 of FIG. 4B in which node 312 now has as children nodes 308, 310, 314, and 316. In the foregoing, a child node of a failed node was selected to assume the role of the child's failed parent. Additionally, the peer or sibling nodes (e.g., 314 and 316) of the selected child (e.g., 312) are now made children of the selected child node. The foregoing may be characterized as rebuilding the subtree formed with the failed node as the root.

As described herein, the node 312 may continually send heartbeat messages to both processors of the down node 304 to detect when node 304 comes back online (e.g., successful heartbeat response message from one of the processor's of node 304). In this case, an embodiment may add the node 304 to the structure of FIG. 4B as a child leaf node of 312. An embodiment may also perform other processing when the node 304 is added to the tree. A rebalancing of the tree may be performed depending on the degree of imbalance in the tree. A heuristic may be used in connection with determining if the tree should be rebalanced or otherwise regenerated by the indication consolidator. The heuristic may be, for example, if a certain threshold number of node failures have occurred. The particular threshold and factors used may vary with each embodiment.

Alternatively, an embodiment may restore the previously failed node to its original position in the structure of 480 by unsubscribing and re-establishing previous subscriptions in accordance with the original structure illustrated in 300 of FIG. 3. In one embodiment, the parent node of the previously failed node may perform the processing to restore the previously failed node to its original position. The parent node tells the previously failed node to re-register with its former children and that the child node that had taken over temporarily is now restored to its previous role as a child node of the previously failed node. The parent node registers on the previously failed node to once again receive indications in accordance with the communication structure. The parent node will also resume sending indications it receives from previously failed node up the tree.

It should be noted that when a publisher or server node, such as a child node, is unable to successfully deliver an indication message to one of its registered subscribers or clients, such as its parent node, the publisher may persistently store all such messages which it cannot deliver. The undeliverable messages may be stored, for example, on a disk or other device. When the original subscriber node comes back online, or another replacement node is specified fulfilling the original subscriber's role in the communication structure, the publisher may resend all previously undelivered indication messages. The trigger event signaling the publisher to resend the previously undeliverable indication messages may be when the original node comes back. For a replacement node, the trigger event may be when the replacement node subscribes to the indications of the publisher. The subscription request from the replacement node may include additional information indicating that the subscription request is actually a resubscription replacing a previous original subscription for the failed node. The publisher receiving the request may then forward any messages undeliverable messages designated for the failed node to the replacement. The subscription request may include a flag or identifier indicating the request as a resubscription as well as a subscription request identifier of the original subscription. Based on this subscription request identifier, the publisher may forward the undelivered indication messages to the replacement node. In one embodiment, there may be a single subscription identifier associated with each subscription tree or structure. The client, such as the management system, passes the subscription identifier as a parameter in making the original subscription request. The subscription identifier may be any unique number such as a sequential number generated by the client concatenated with the client's IP address. This subscription identifier may be passed down the subscription structure in connection with registration as part of the information included in the subscription request. In connection with processing described herein for resubscription requests such as when a parent node reconstructs a portion of the tree when one of its children is determined to be down, the subscription identifier is included in the resubscription request and is used by the publisher to determine which original subscription is being resubscribed to.

When a designated indication consolidator node has failed, the client, such as the management system 16, is so notified. The client may then select a new indication consolidator node. The client previously made an original subscription request for indications from the failed node and the client now makes a new subscription request, or a resubscription request, to the new indication consolidator node. The new indication consolidator node may then build a new communication structure and issue resubscription requests to all the nodes in accordance with the new communication structure as described herein. The resubscription requests may include the identifier associated with the previous original subscription request made by the failed indication consolidator. As described above, the foregoing resubscription triggers forwarding any messages associated with this subscription which were previously undeliverable to the failed indication consolidator node.

In one embodiment, when a parent node selects a replacement node for a failed child, the parent communicates information to the replacement node to assume its replacement role. For example, the parent node supplies the replacement node with the appropriate relative node information so that the replacement node may make its appropriate resubscription requests to its own children. The parent node may also be responsible for sending updated relative node information to any of its children in accordance with any replacement node The parent node also may notify its parent regarding any updates it makes to the communication structure such as in connection with node failover processing In turn, such information may be propagated up the tree to each node's respective parent in order to ensure that each node has the appropriate subtree information. An embodiment may also choose to persistently store and replicate on each node the entire communication structure replacing the relative node information (e.g., see FIG. 5) described elsewhere herein. Any updates to the communication structure may be reflected using the replication service as described herein. Note that the use of the replication service is described herein for persistently replicating the DDB on each node in the domain.

Figure 5:
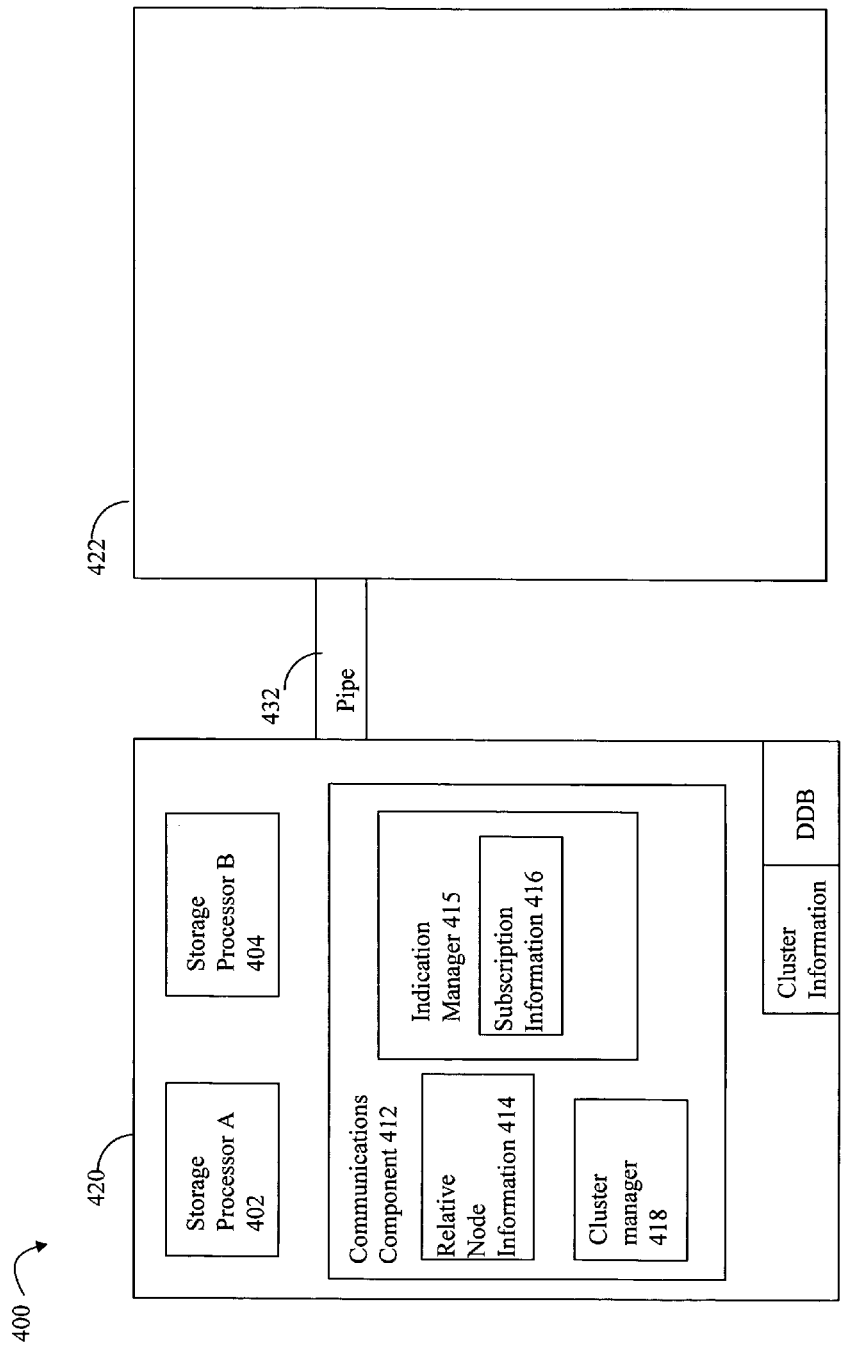
FIGS. 5 and 6 are examples of additional components as may be included on each node of a domain.

Referring now to FIG. 5, shown is an example 400 of two nodes which may be included in a communication structure used for indication forwarding. The example 400 includes two data storage systems as nodes 420 and 422 of the domain, such as domain 102 illustrated in FIG. 2. The two data storage systems may communicate over the persistent pipe 432 for indication forwarding. It should be noted that additional details are provided for only data storage system 420, although data storage system 422 and others in the domain include the same components. The connection end points of the pipe 432 may be between the active processor of node 420 (e.g., one of the storage processors 402 or 404) and the active processor of node 422. Also included in 420 are the DDB and cluster information as may be persistently replicated on each node. The details of the different components of data storage system 420 are included for purposes of illustrating those used in connection with the communications component 412 of each node although, as will be described in connection with other figures, an embodiment may include other components in each node.

The communications component 412 facilitates communications in connection with the indication forwarding technique described herein. The communications component 412 includes cluster manager 418, relative node information 414 and indication manager 415. Included in indication manager 415 is the node 420's subscription information 416. The cluster manager 418 performs functionality as described previously in connection with component 120 of the management system 16 of FIG. 2. However, in this instance, the cluster information managed is the complete copy of cluster information with respect to the entire domain. The cluster manager 418 may update the cluster information in accordance with any failed nodes or change in which processor of a node is "active" as performed by node 420 acting as a subscriber performing failover processing. The cluster manager 418 accordingly informs the indication manager 415 of any such changes so that the appropriate subscription request updates are made. The indication manager 415 stores the node 420's own subscription information so that it is able to issue any needed resubscription requests. The cluster manager 418 may use the heartbeating technique as also described herein in order to monitor connections with its child nodes. When initially subscribing to its child nodes in accordance with the indication forwarding communication structure produced by the indication consolidator node, the cluster manager 418 may also use heartbeating to establish a connection to its child's active processor, as may be determined using the cluster information.

The indication manager 415 may also be responsible for reporting indications to its subscribers, which in this instance is the parent node as stored in the relative node information 414. In the event that the indication manager 415 is unable to successfully send the indications to its parent node, the indication manager 415, as a publisher, may store the undeliverable messages and attempt redelivery at a later time when a connection can be established to the original parent node, or another node assuming the role of original parent node.

Figure 4B:
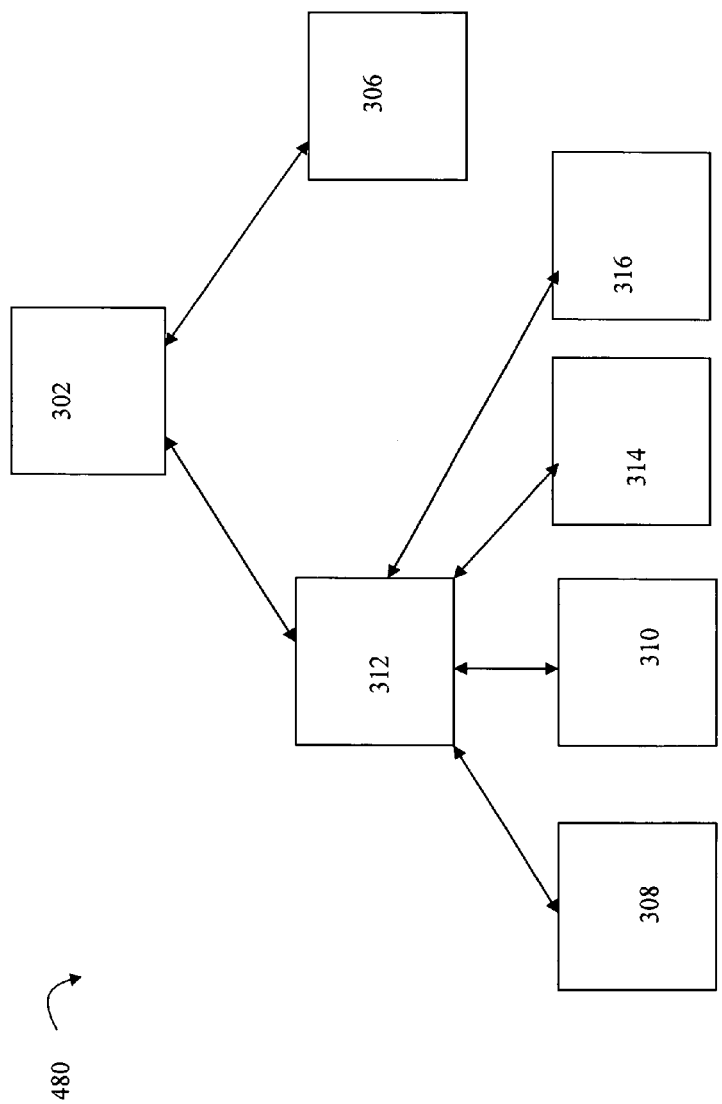

The communications component 412 also includes relative node information 414. The relative node information 414 may identify the parent of node 420 and the information describing the subtree formed with node 420 as the root. The information for each node included in 414 may be specified in terms of a node or cluster identifier and the associated IP addresses of each of the respective processors of that node. The relative node information 114 for the subtree may be used in connection with performing failover processing as illustrated in FIGS. 4A and 4B if node 420 detects that one of its child nodes has failed. In this instance, node 420's communication component 412 may attempt to rebuild the subtree with the failed child of 420 as the root.

It should be noted that the relative node information 414 and the subscription information 416 may be persistently stored on node 420. Additionally, the foregoing information, along with other information of node 420, may be stored in a location which is accessible by both storage processors 402 and 404 in order to facilitate failover processing within a single node (e.g., the passive processor assuming the role of the active processor).

As will be appreciated by those skilled in the art, an embodiment may choose not to store the entire subtree formed with node 420 as the root in 414. The number of levels of the subtree formed with node 420 as the root which may be stored in 414 of an embodiment may vary in accordance with how many repeated failovers may be attempted. For example, referring back to FIG. 4A, it is possible that all child nodes of failed node 304 may also failed. In such case, an embodiment may further select a node from any grandchildren of the failed node if such information is stored in 314. Otherwise, an embodiment may choose to rebuild the communication structure in the event such further information about the grandchildren of the failed nodes is not available.

The indication consolidator may monitor the health and status of all nodes in the domain. The indication consolidator may be responsible for keeping the cluster information, as replicated and persistently stored on each node, up to date. For example, the indication consolidator's cluster manager may be notified when a node is added or removed from the domain. The selected consolidator may monitor the domain for configuration changes. This may be performed, for example, by monitoring changes to the DDB. When a node is added to the domain, the indication consolidator may be responsible for sending initial heartbeat messages to the new node and establishing one of the new node's processors as the active processor. The indication consolidator node may accordingly update the cluster information and rebuild the communication structure used for indication forwarding to add the new node. This may include any new subscription requests in accordance with the communication structure. The indication consolidator node may add the new node to the existing communication structure as a leaf node. Alternatively, the indication consolidator may generate a new communication structure, such as a new tree structure as illustrated in FIG. 3 to include the new node, when certain threshold criteria are determined to exist as described elsewhere herein.

If a node is removed from a domain, the indication consolidator may also update the existing communication tree. This may include unsubscribing from removed nodes and adjusting the existing communication tree to remove the node if the node was an intermediate node in the tree. Alternatively, if the removed node is an intermediate node in the communication tree and not a leaf node, a new communication structure may also be generated.

Figure 6:
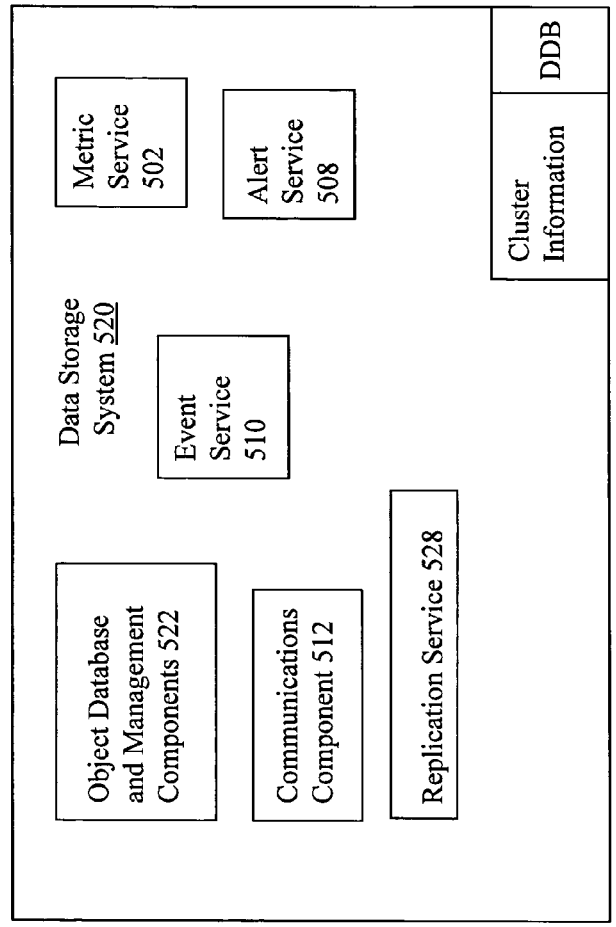

Referring now to FIG. 6, shown is an example of components that may be included in an embodiment of a node which is a data storage system for use in connection with the techniques described herein. In the example 500, the data storage system 520 may be a node in a domain as illustrated, for example, in FIGS. 2, 3 and 5. The example 500 illustrates additional components that may be included in an embodiment of a node. The data storage system 520 includes the communications component 512 (as illustrated and described in FIG. 5), a replication service 528, an object database and management components 522, an event service 510, a metric service 502, an event queue 506, an event provider 504, an alert service 508 and the DDB and cluster information.

The object database and management components 522 may collectively represent a database of objects defined for the data storage system 520 and associated components for the management and retrieval of information from the database. The object database may include current information or properties about each object. The properties may include, for example, status of an associated object, various metrics such as throughput, total capacity, and used/unused capacity (e.g., for a physical device or logical volume), and the like, about an object.

The replication service 528 may be used in connection with replication of the DDB and cluster information on all nodes in the domain. It will be appreciated by those skilled in the art that any one of a variety of different techniques may be used in connection with such persistent data replication. One such technique is described in U.S. patent application Ser. No. 10/027,694, filed Dec. 20, 2001, entitled DATA REPLICATION FACILITY FOR DISTRIBUTED COMPUTING ENVIRONMENTS", which is incorporated by reference herein.

Each data storage system in this example 500 also include a metric service 502, an event service 510, and an alert service 508. The metric service 502 may access information in the object database and management components 522 to send indications on particular metrics or other properties of objects. The event service 510 may send indications upon the occurrence of an event. The alert service 508 may send indications upon the occurrence of an alert. As described elsewhere herein, the foregoing use of metrics, events and alerts may be characterized as forming a hierarchy. The metric service 502 may be characterized as the lowest or finest level of granularity firing indications for individual metrics or other properties. The event service 510 may be characterized as the next increasing level of granularity firing indications upon the occurrence of events, such as when a metric or property has a particular state or condition. The alert service 508 may be characterized as the highest level in the hierarchy firing indications upon the occurrence of alerts intended for the user, such as resulting in display on an output device of the management system 16. An alert may be fired, for example, when a particular event indication is fired. Although an embodiment may allow any service (e.g., metric, event and alert) to subscribe to any other service on the same or different nodes, an embodiment may define a policy enforcing rules in accordance with a subscription hierarchy restricting what services can subscribe to other services. For example, an embodiment may define a policy so that each of the services included in a higher level may subscribe to another service at the same or at the next lower level (e.g., alert service may subscribe to an event service or another alert service, an event service may subscribe to a metric service or another event service, metric service may subscribe to another metric service). The particular services included in each level may vary with embodiment. Alternatively, an embodiment may not define a policy such as the foregoing and may rather define a policy so that any node in the domain may subscribe to any such service located on its own local node or another node in the domain.

It should be noted that the event service 510 may use an event queue as the structure for holding event indication as may provided by the event service. Subscribing to the event service 510 in this example provides for a subscription to an event queue. The event service 510 fires the event indications. If the event service 510 subscribes to another node's event service, the other node's event service fires such indications and they are sent to the event service 510.

In one use of the techniques described herein, the indication forwarding technique may use the communication tree of FIG. 3 with cascading event queues or event services. In such an arrangement, the same set of filter criteria may be specified for all event services and the event service of a parent node includes indications for any local events on the parent node as well as all indications from the event services of its children. Each event service of the parent subscribes to receive event indications fired from its children's event services. The event services in the leaf nodes include only indications for its local nodes. Event indications are pushed up the tree structure to the root node. The event services of the indication consolidator receives all the indications for all events in the entire domain. The management system 16 may be a subscriber to the indication consolidator's event service to further receive the domain event indicators in the indication consolidator.

An embodiment may include a variety of different indication types and associated filters. The filters may be specified in the subscription request to filter out only those indications of interest in accordance with the criteria of the filter. It should be noted that the following are specified in terms of objects (e.g., object associated with a LUN or logical units) and classes of objects (e.g., all LUNs of a defined class) as may be utilized in connection with object oriented programming. In one embodiment, the following indication types may be included: instance creation, instance destruction, and change in property of an existing object. The following indication filters may be included in an embodiment:

by class name for when instances of objects belonging to the class are created and/or destroyed;

by instance name when the instance is destroyed or changed; and by property name when the associated property changes.

An embodiment may also allow indications based on particular values, such as when a property reaches a particular threshold or value.

Other embodiments may include different types of indication filters and types than as described herein. It should be noted that the an embodiment may use the foregoing indication filters and types in connection with each of the services available. The indication filter and types are applied to the particular kind of object associated with that service. For example, the foregoing indication filters and types are with respect to event objects for subscription requests processed by an event service.

Figure 7:
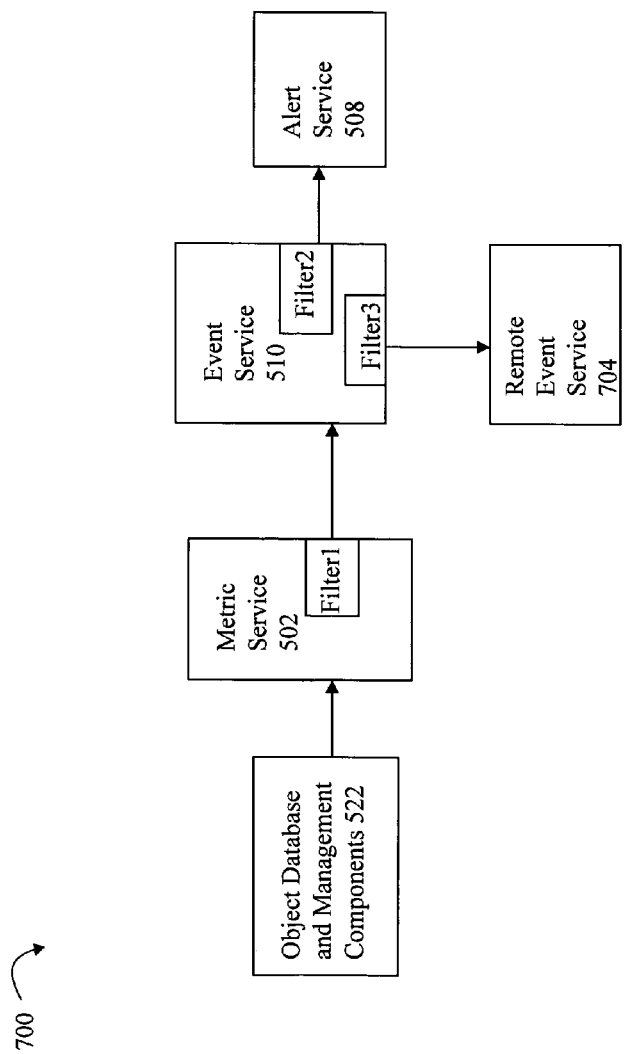
FIG. 7 is an example illustrating the data flow of the subscription services available on multiple nodes.

Referring now to FIG. 7, shown is an example 700 illustrating the use of the services as may be included in an embodiment with indication forwarding. The example 700 includes components as may be included in a local node as illustrated in FIG. 6 and components of another remote node. The example 700 illustrates the data flow between the different components in one particular application and arrangement. The components 522, 502, 510 and 508 may be included in a same local node (e.g., a child node) and the component 704 may be included in a remote node (e.g., a parent node). The metric service 522 may obtain data in connection with one or more objects from the object database and management components 522. The metric service 522 may gather metrics or other properties and report these as fired indications. The event service 510 may subscribe to the metric service 502 in accordance with filter1. The metric service 502 fires indications in accordance with filter1 to the event service 510. Event service 510 has two subscribers, alert service 508 and remote event service 704. The event service 510 fires indications to the alert service 508 in accordance with filter 2. Filter2 indicates the events of interest to the alert service 508 and filter2 was previously specified when the subscription request was made by alert service 508. The event service 510 fires indications to the remote event service 704 in accordance with filter3. Filter3 indicates the events of interest to the remote event service 704 and filter3 was previously specified when the subscription request was made by the remote event service 704.

The foregoing illustrates one indication forwarding arrangement in which services on a local node may fire indications to other services on the same or a remote node.

What will now be illustrated and described are three ways in which a solution may be provided to generate a same alert. In this example, a text message is displayed on the GUI 110 of the management station 16 when a LUN is determined to have excessive load, In this example, the threshold associated with this determination may be defined in accordance with one or more parameters. When the load associated with the LUN exceed the threshold, the text message is displayed on the GUI 110. The generation of the text message when the LUN has an excessive load is part of an indication fired by an alert service on an indication consolidator node. In this example, there are three nodes, A, B, and C in the domain, which utilize the LUN of interest so it is necessary to obtain metric information for the LUN from each of nodes A, B, C. Node A is also the selected indication consolidator node in this example.

Figure 8A:
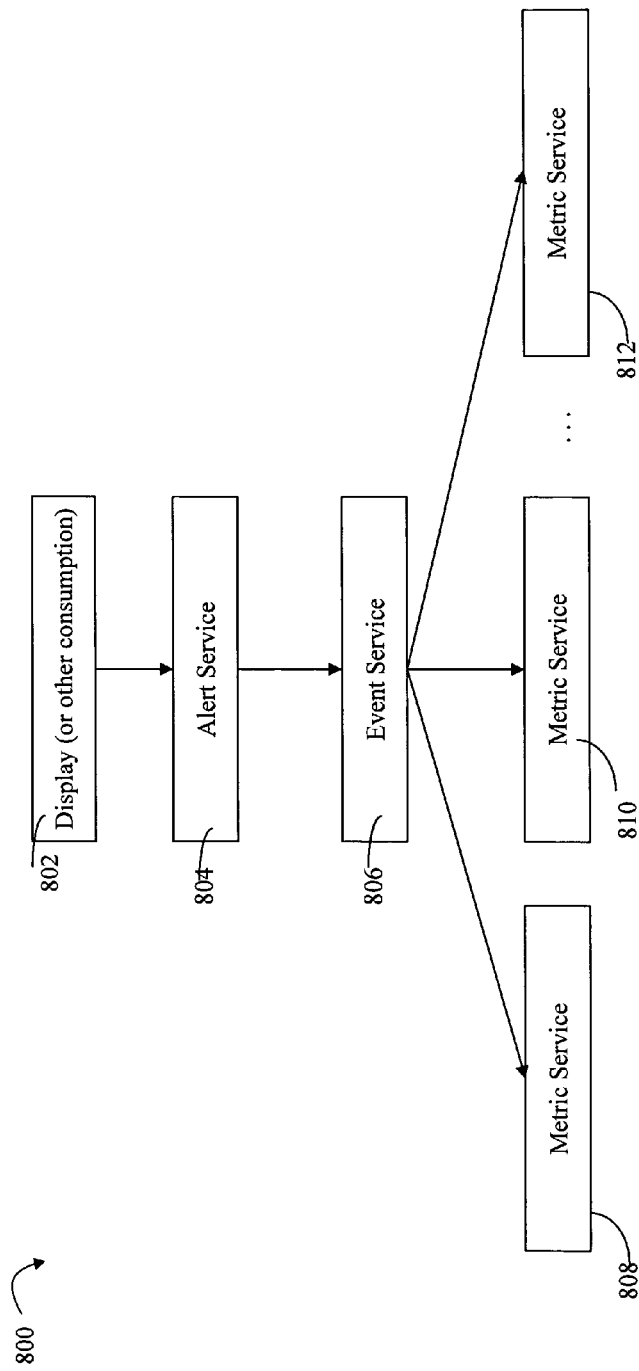
FIGS. 8A, 8B, and 8C are examples illustrating different ways in which the different services may different nodes may be used in solving a same problem.

Referring now to FIG. 8A, shown is one arrangement 800 of the various services and indication subscriptions that may be used in monitoring conditions in the domain for the LUN. 802 corresponds to the management station 16 which subscribes to the alert service of node A 804. The alert may be fired by the alerts service of node A when node A's event service 806 determines that a particular metric of the LUN exceeds a threshold. When the metric of the LUN exceeds a threshold, the event service 806 of node A fires an indication to the alert service 804. The event service 806 subscribes to metric changes as may be determined by metric services on local node A 808, and remote node B 810 and node C 812. Each of the metric services 808, 810 and 812 fires indications to the event service 806 when the one or more metrics used in determining the load of the LUN. The event service 806 processes such information and fires an event when the threshold level is determined.

Figure 8B:
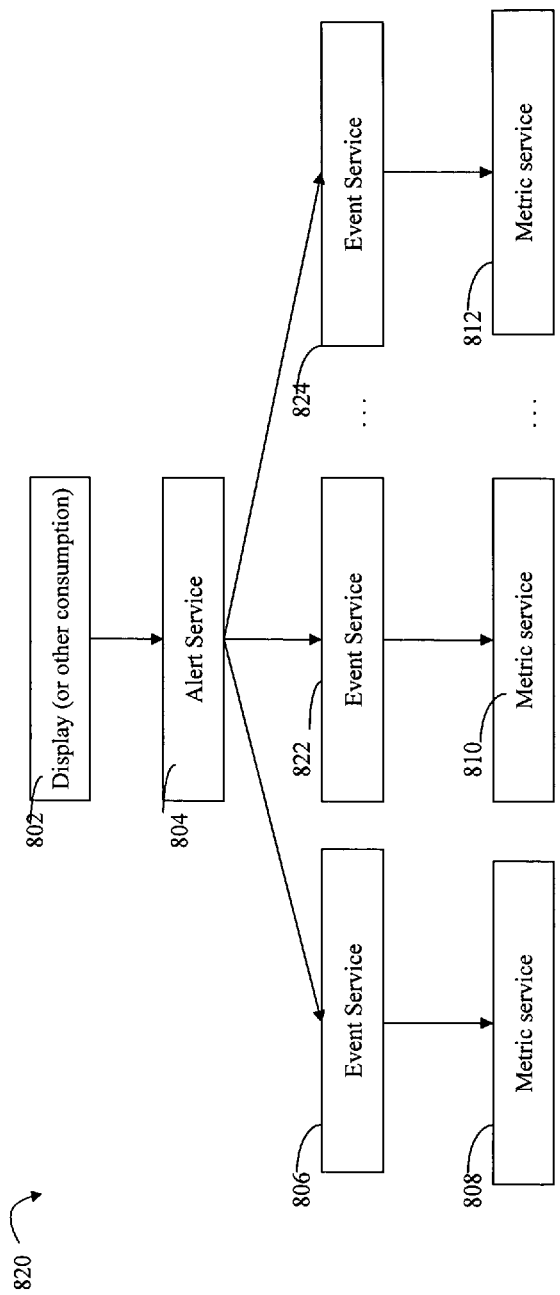

As another subscription arrangement for monitoring domain conditions associated with the same alert. In this example as illustrated in FIG. 8B, the management system 16 as represented by 802 subscribes to the alert service 804 of node A. The alert service 804 of node A subscribes to its own local event service 806, and the event service of node B 822 and the event service of node C 824. Each of the event services of each node A, B and C subscribe to its own local metric service. The event service of node A 806 subscribes to the metric service of node A 808. The event service of node B 822 subscribes to the metric service of node B 810. The event service of node C 824 subscribes to the metric service of node C 812.

In the foregoing, the hierarchical arrangements in FIGS. 8A and 8B represent the subscription requests and associated indication forwarding to the various services. The various services may reside on any single node or one or more nodes with remote subscriptions.

As another subscription arrangement for monitoring domain conditions associated with the same alert. In this example as illustrated in FIG. 8C, the management system 16 subscribes to the alert services of nodes A, B and C to receive all alerts for the entire domain as in connection with the previous FIGS. 8A and 8B.

Figure 8C:
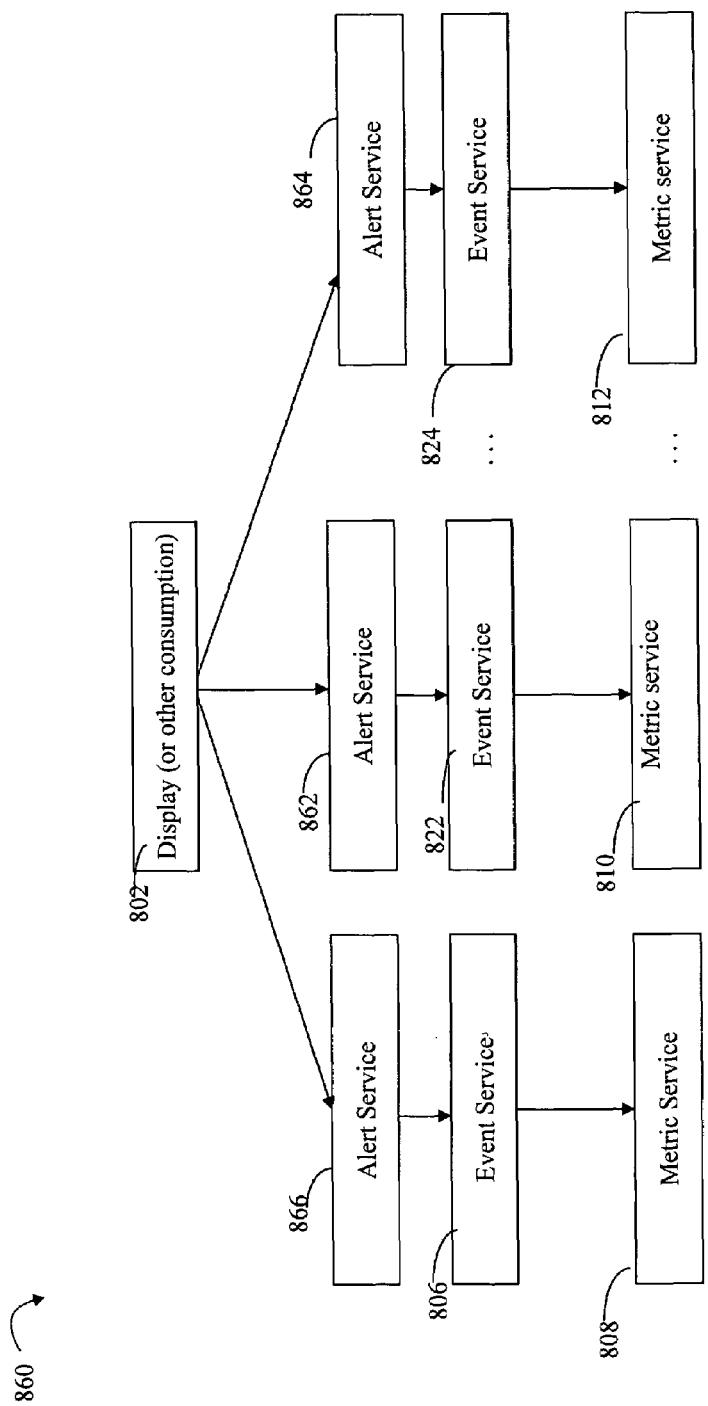

FIGS. 8A-8C illustrates various ways in which the same sets of services on nodes may be used in different ways to solve the same problem. It should be noted that the particular way in which an embodiment chooses to utilize these services to solve a problem or task may vary. For example, the arrangement included in FIG. 8C may be selected in order to minimize the amount of messages exchanged between nodes. It may be that the number of indications fired from a metric service exceeds the number of indications fired by an alert services. For this reason, the arrangement in FIG. 8A (e.g., nodes B and C fire metric indications to node A) may greatly increase the messages exchanged between nodes in contrast to the arrangement in FIG. 8C (e.g., nodes B and C fire alert indications to node A).

Figure 9:
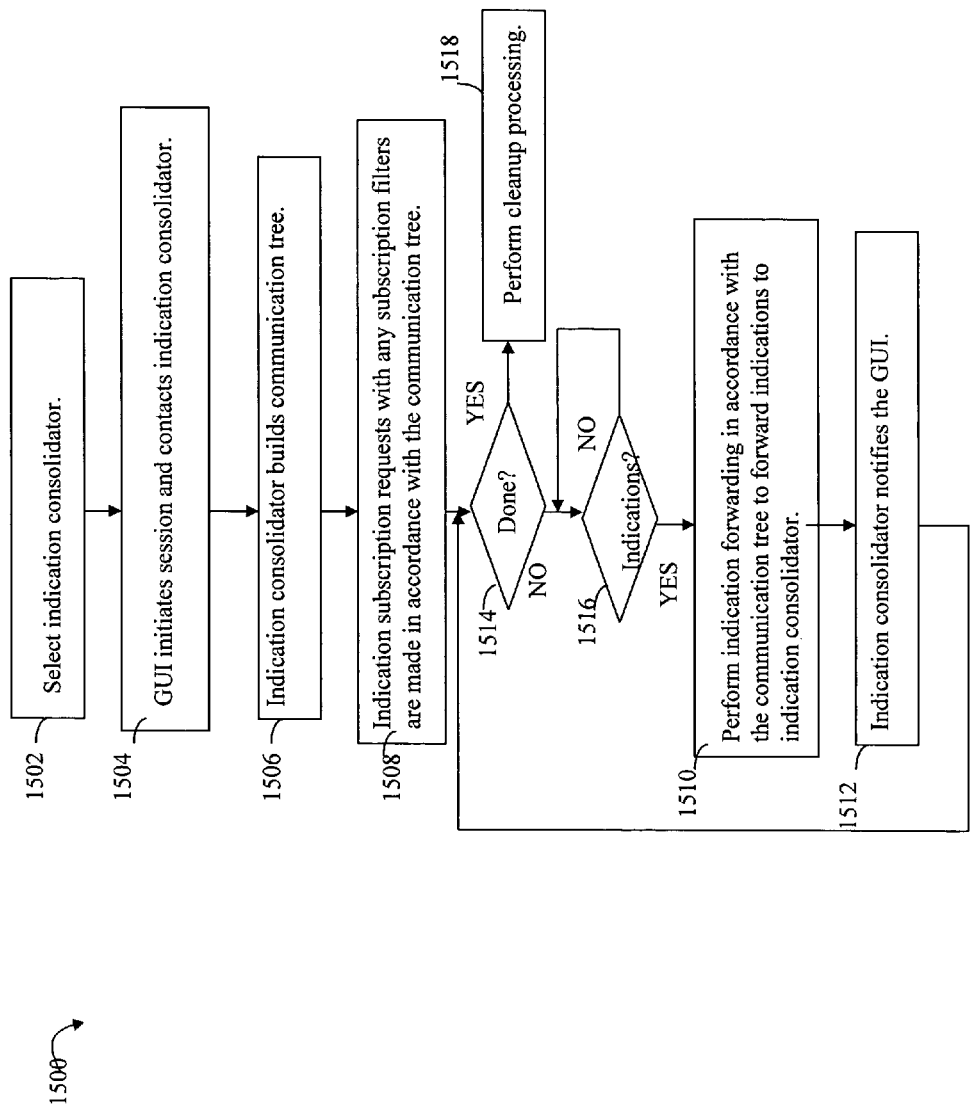
FIGS. 9, 10 and 10A are flowcharts summarizing processing that may be performed in an embodiment in connection with the techniques described herein.

Referring now to FIG. 9, shown is a flowchart summarizing overall processing as described herein with indication forwarding. At step 1502, an indication consolidator is selected using any one a variety of different techniques. In one embodiment, the user may select an indication consolidator. At step 1504, the GUI initiates a session to receive reports and contacts the indication consolidator. It should be noted that although the GUI is specifically mentioned herein, any application or other component as may be included in the management system 16 may also function as the remote client making the request. The GUI subscribes to a service on the indication consolidator to receive indications. At step 1506, the indication consolidator builds the communication tree to be used in connection with the indication forwarding technique described herein. The communication tree may be, for example, as illustrated in FIG. 3. At step 1508, the indication subscription requests are made with any subscription filters in accordance with the communication tree. As described herein, each parent node becomes as subscriber to indications on its child nodes in accordance with the communication tree. Once the appropriate subscription requests have been made, the communication connections are arranged for performing indication forwarding for any such indications. At step 1514, a determination is made as to whether processing for the current session is complete. Processing may be complete, for example, if the GUI terminates the session. If not, control proceeds to step 1516 to wait for an indication to be forwarded. If there are currently no indications to be forwarded, control proceeds to step 1516 to wait for indications to be forwarded from one of the nodes in the communication tree. When there is an indication to be forwarded, control proceeds to step 1510. At step 1510, indication forwarding is performed as indications are fired in accordance with the communication tree to push the indications up the tree in accordance with the filters to the indication consolidator. At step 1512, the indication consolidator notifies the GUI. Control proceeds to step 1514 to wait for the session to be completed or for additional indications to be forwarded. If step 1514 evaluates to yes, control proceeds to step 1518 to perform cleanup processing. Such processing at step 1518 may include tearing down the communication tree such as by issuing any needed unsubscription requests. Step 518 may also include processing to close down any internode connections for the indication forwarding, such as the persistent pipes.

Figure 10:
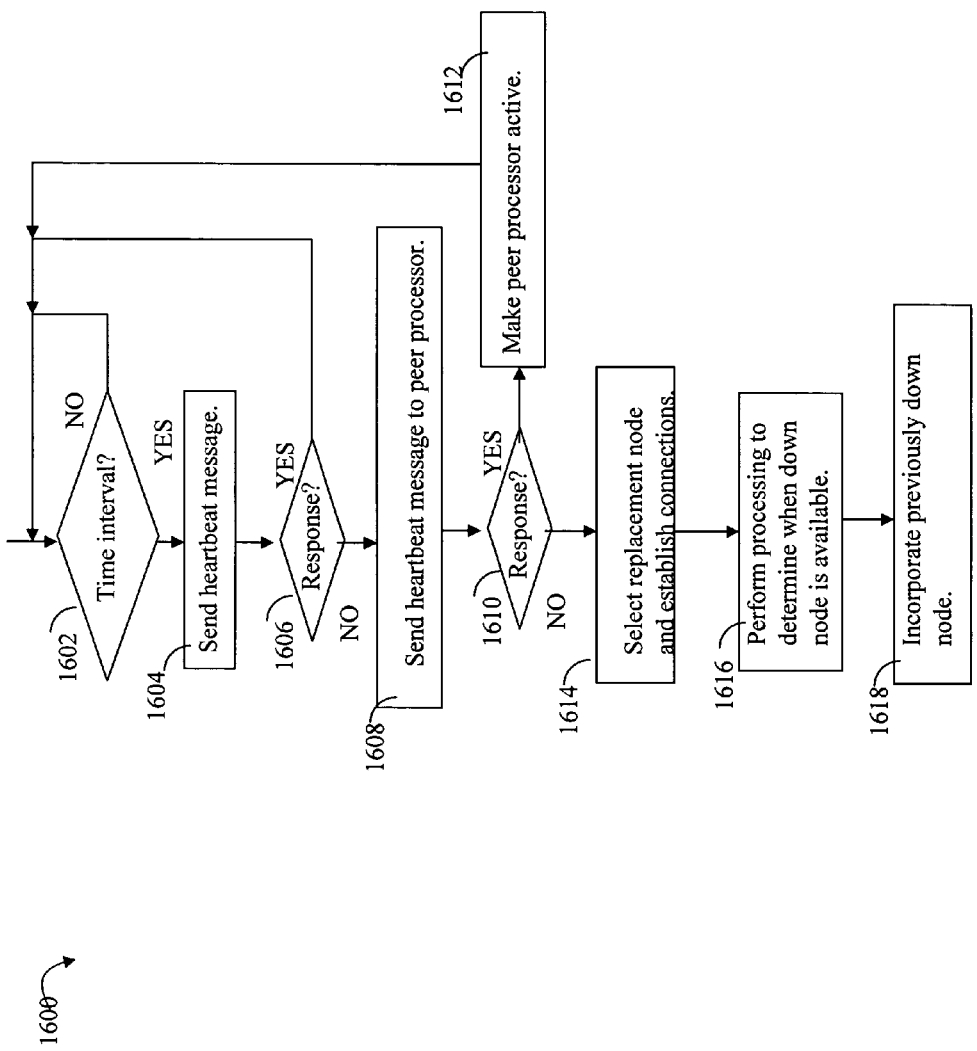

Referring now to FIG. 10, shown is a flowchart of processing steps that may be performed in an embodiment by each parent node in connection with its children to maintain communication connections for indication forwarding. At step 1602, a determination is made as to whether the heartbeat time interval has been reached. If not, control proceeds to step 1602 to wait until such time. In one embodiment, the heartbeat time interval may be specified so that a parent issues a heartbeat message to its child nodes every 2 minutes. Once the time interval has been reached, control proceeds to step 1604 to send the heartbeat message to the child node. If there is a response received from the child node, control proceeds to step 1602 to wait for the next time interval. It should be noted that although the processing described herein is for a single child node, the parent node may perform the same processing for each of its child nodes. If step 1606 evaluates to no, control proceeds to step 1608 where a heartbeat message is sent to the child node's peer processor since the currently active processor is not responding. If the peer processor responds, control proceeds to step 1612 where the parent node makes the peer processor the active one and updates any information to indicate the other processor as inactive and inoperative/non-responsive. Control proceeds to step 1602. If step 1610 evaluates to no, control proceeds to step 1614 to select a replacement node. It should be noted that step 1614 may not be necessary if the down node is a leaf node. The replacement node may be selected using any one of a variety of different techniques such as illustrated in connection with FIGS. 4A and 4B. Step 1614 also includes establishing any needed connections to the replacement node, reissuing any subscription requests, and other processing as may be needed for the replacement node. At step 1616, the parent node performs processing to determine when the down node is available and then incorporates the previously down node into the communication tree at step 1618. As described herein, the particular placement of the previously down node in the tree may vary. Also, an embodiment may decide to reconstruct the communication tree entirely to incorporated the previously down node.

Figure 10A:
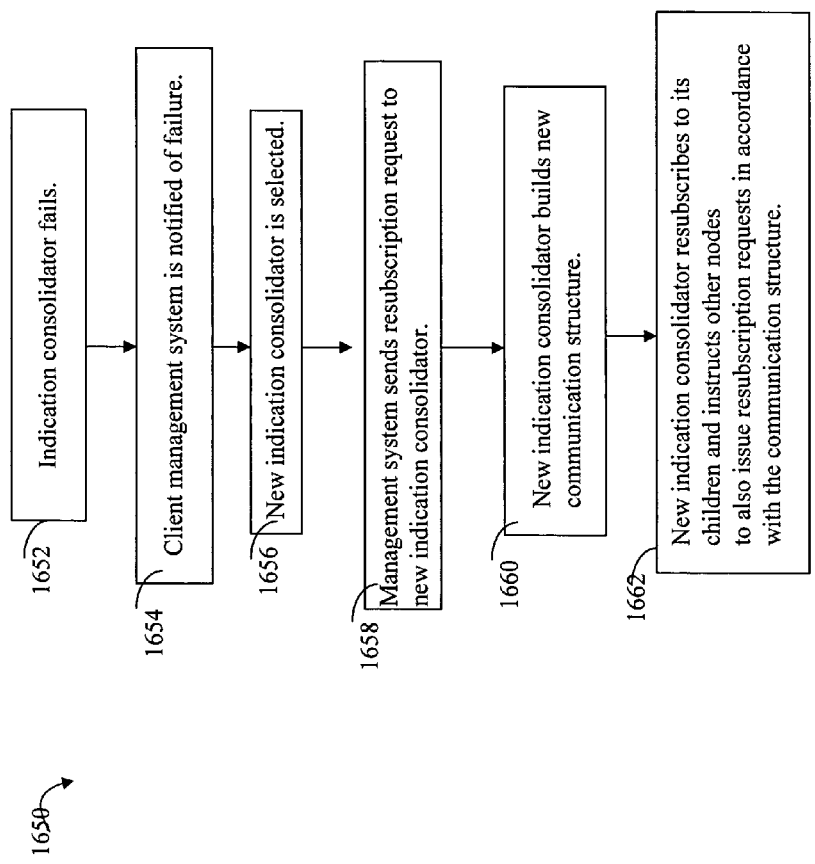

Referring now to FIG. 10A, shown is a flowchart 1650 of processing steps that may be performed in an embodiment when an indication consolidator node fails. The processing of 1650 summarizes steps described previously herein. The failure occurs at step 1652 and the client management system is notified of the failure at step 1654. At step 1656, a new indication consolidator node is selected. At step 1658, the management system sends a resubscription request for indications to the new indication consolidator node. At step 1660, the new indication consolidator builds the new communication structure such as, for example, the structure illustrated in FIG. 3. At step 1662, the new indication consolidator issues a resubscription request to its children in accordance with the new communication structure and also instructs the other nodes to also issue resubscription requests in accordance with the new communication structure. As described herein, if the communication structure is as illustrated in FIG. 3, the nodes are instructed to subscribe to receive indications from their children. Additionally, as described elsewhere herein, the resubscriptions are the trigger event causing any previously undelivered messages for the failed consolidator node to be forwarded up the new communication structure to the root node, the new consolidator node.

Figure 11:
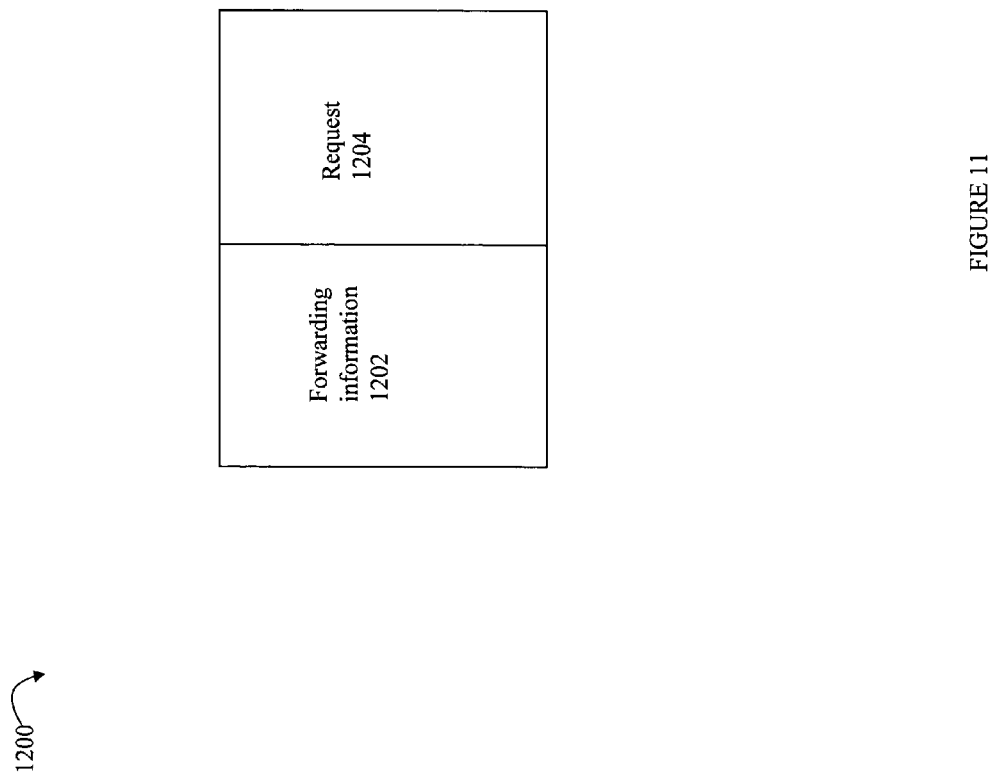

Referring now to FIG. 11, shown is an example 1200 illustrating the message as may be forwarded from one node to another node as part of establishing the subscriptions for indications between children and parent nodes. Such a message may be forwarded from the indication consolidator node to other nodes, as well as a from any parent node to a child node so that a service on the parent node subscribes to a service on the child node. As described in U.S. patent application Ser. No. 09/877,862, which is incorporated by reference herein, the message may include forwarding information 1202 and a request portion 1204. The request portion 1204 may describe the particular information being requested. In an embodiment using the indication forwarding technique, the forwarding information 1202 may be customized for each node and the other nodes from which further requests are to be made. In other words, the customized forwarding information 1202 may specify the addresses of all the nodes in an instance of the tree as illustrated in FIG. 3 to whom the request is to be forwarded. The request may identify, for example, the particular property, group, and/or objects for which information is requested.

Such a request may be sent between nodes as well as between the management system and a node of a domain.

Referring now to FIG. 12, shown is an example of an embodiment of a request portion of a message for a subscription request. The example 880 shows a more detailed example of portion 1204 of a message. The example 880 is an XML message although an embodiment may use other message formats. The example 880 includes specifies the indication filter as "by instance name" (e.g., instance name in this example is UniqueKeyFromObject) and the type of indication as "change". When the named instance of the object has a change in any property, an indication is sent to the subscriber indicating the change. The example 880 also includes text 882 for a parameter value FORWARD indicating whether or not this request is further forwarded to other nodes. In this example, the value is true indicating that this request is to be forwarded to other nodes with the same filtering information in accordance with the indication forwarding techniques as described herein. The particular nodes to whom this request is to be further forwarded by the receiving node is indicated in another portion of the message including forwarding information. In one embodiment, an object-oriented approach may be used in which objects are used to represent the events, alerts, objects, and the like. Classes of the foregoing may also be defined. In such an embodiment, the particular service being subscribed to may be implicit in the class name of the object as implemented on the particular provider or publisher. In one embodiment utilizing the techniques described herein, the request may include a subscription identifier and also:

1. a type of subscription about which indications are to be forwarded. These types may include change, create, and/or destroy. When any one or more of the foregoing as indicated in the request occurs in accordance with the remaining items in the request, an indication is fired.

2. instance name (e.g., object name) or class name.

3. filter expression statement.

It should be noted that a similar version of the foregoing example 880 may be used in connection with sending subscription cancellation requests. Such requests may be sent, for example, when the GUI discontinues its session as part of the cleanup processing.

Referring now to FIG. 13, shown is an example of an indication message as may be sent to a subscriber in accordance with the request 880. The example 890 lists the various property values for the object instance in accordance with a previous corresponding subscription request. For example, the indication illustrated in FIG. 13 may be forwarded in response to a subscription request to fire an indication when properties about the particular object instance change It should be noted that although a node is illustrated herein as being a data storage system, the techniques used herein may be applied to other entities having connectivity with respect to nodes in a domain. A node is illustrated herein as a data storage system. However, a node used in connection with the techniques described herein may be any entity having connectivity with respect to other nodes in a domain and having the appropriate components as illustrated in connection with FIGS. 5 and 6. For example, a node may be a host or server, a network device, and the like, connected to other nodes in the domain and also having the components used in connection with the object data and group data.

Figure 14:
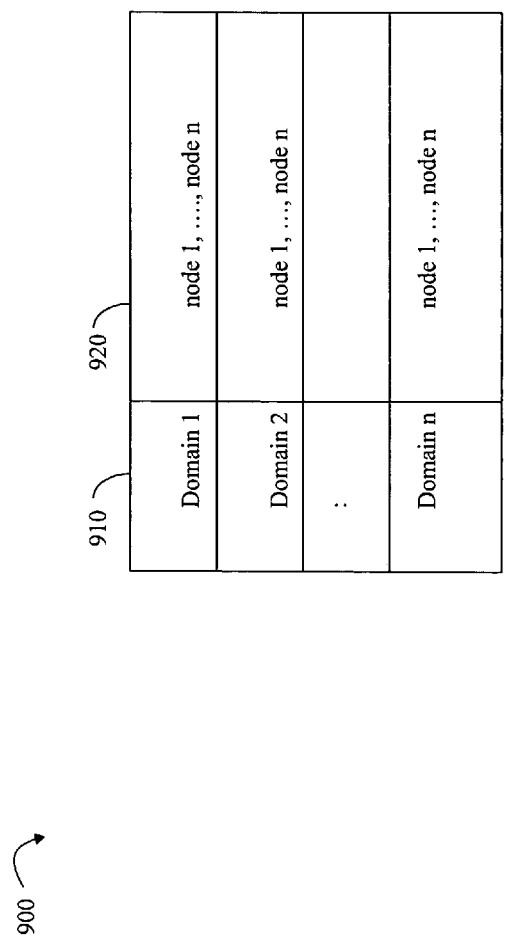
FIGS. 14, 15, 16, 17, 18, and 19 are examples of various structures that may be utilized in an embodiment in connection with the techniques described herein.

Referring now to FIG. 14, shown is an example 900 of domain information as may be utilized in connection with element 118 of FIG. 2. The table 900 may include a entry for each domain. The domain identifier is indicated in column 910 with the particular nodes for the domain included in column 920 of the same row. The example 910 is a representation of a domain information as may be included in 118 for use with the GUI and other components of the system 16.

Figure 15:
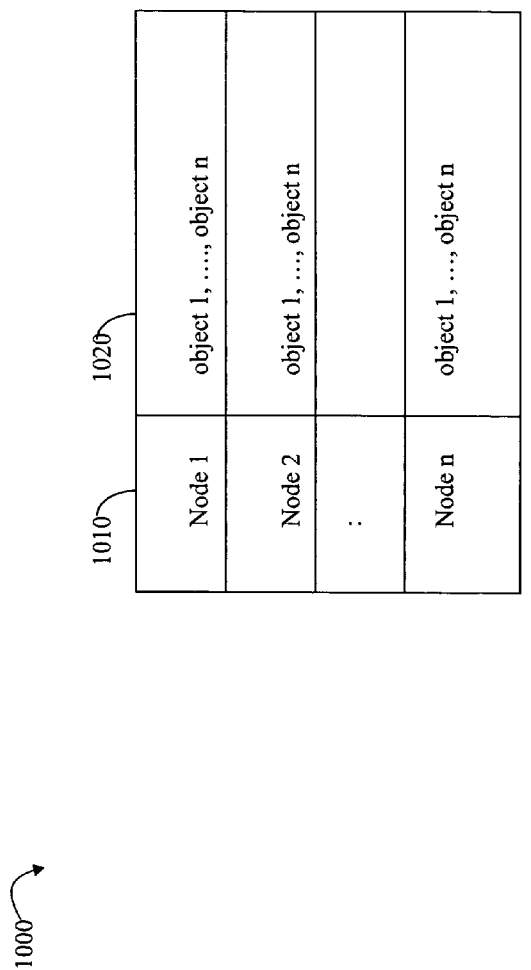

Referring now to FIG. 15, shown is an example 1000 of objects that may be defined or included for each node in the domain. The table 1000 includes an entry for each node in the domain. The node identifier is indicated in column 1010 with the particular objects for the node included in column 1020 of the same row. The information in 1000 may be utilized in connection with element 116a of FIG. 2. Such information may be used, for example, when displaying information to a user in connection with selecting objects when performing operations on the management system 16. It should be noted that an embodiment may temporarily construct the table 1000 during the processing on 16. Accordingly, requests may be issued as needed to obtain information as to what objects are defined for each node. Recall, as described elsewhere herein, the element 16a may include a subset of information about a domain as needed in accordance with GUI processing and user selections.

Figure 16:
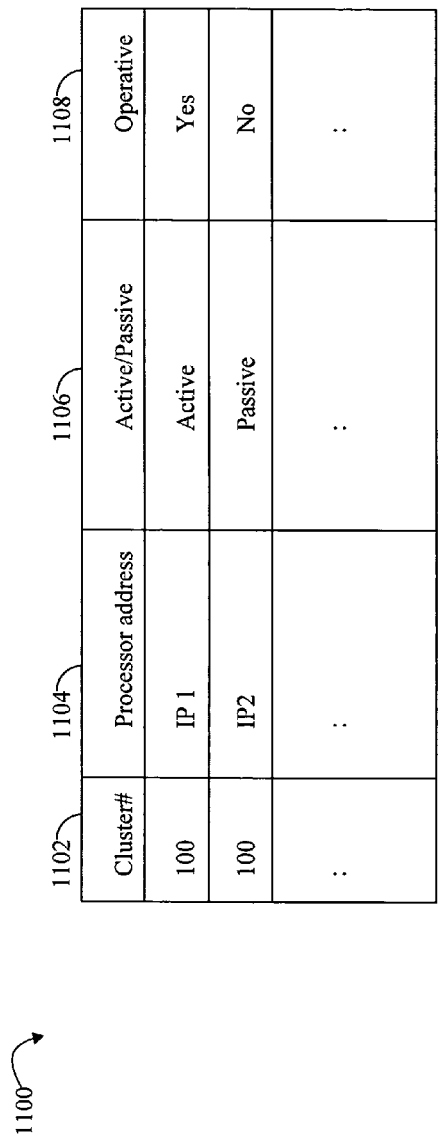

Referring now to FIG. 16, shown is an example 1100 illustrating a table of cluster information. The component 120 may use the foregoing arrangement for the subset stored on the management system 16. The arrangement illustrated in 1100 may also be used for the cluster information 526 as stored persistently on each node. Table 1100 includes an entry for each processor in a data storage system. Processors belonging to the same data storage system may be identified by the cluster number or identifier included in column 1102. Column 1104 specifies the IP address of the processor. Column 1106 indicates whether that particular processor of the cluster is the active processor for that cluster. Column 1108 indicates whether the particular processor associated with the entry is operative or otherwise in a failed state. In the event that a processor is inoperative, column 1108 indicates No and the associated state in 1106 is indicated as Passive.

It should be noted that rather than incur the overhead associated with persistently storing at each node a table such as illustrated in FIG. 16 of cluster information (e.g., cluster information of FIG. 5 as used by the cluster manager 418), or a subset thereof (e.g, as for 418 on the management system 16 of FIG. 2), an embodiment may include all or portions of this information in the persistently stored DDB. In one embodiment, the DDB may include the information illustrated in columns 1102 and 1104 and may derive information other information therefrom, such as included in column 1106. In such an embodiment, for example, the cluster manager 418 may utilize the DDB to obtain the IP address of a peer processor or another node in connection with failover processing.

Figure 17:
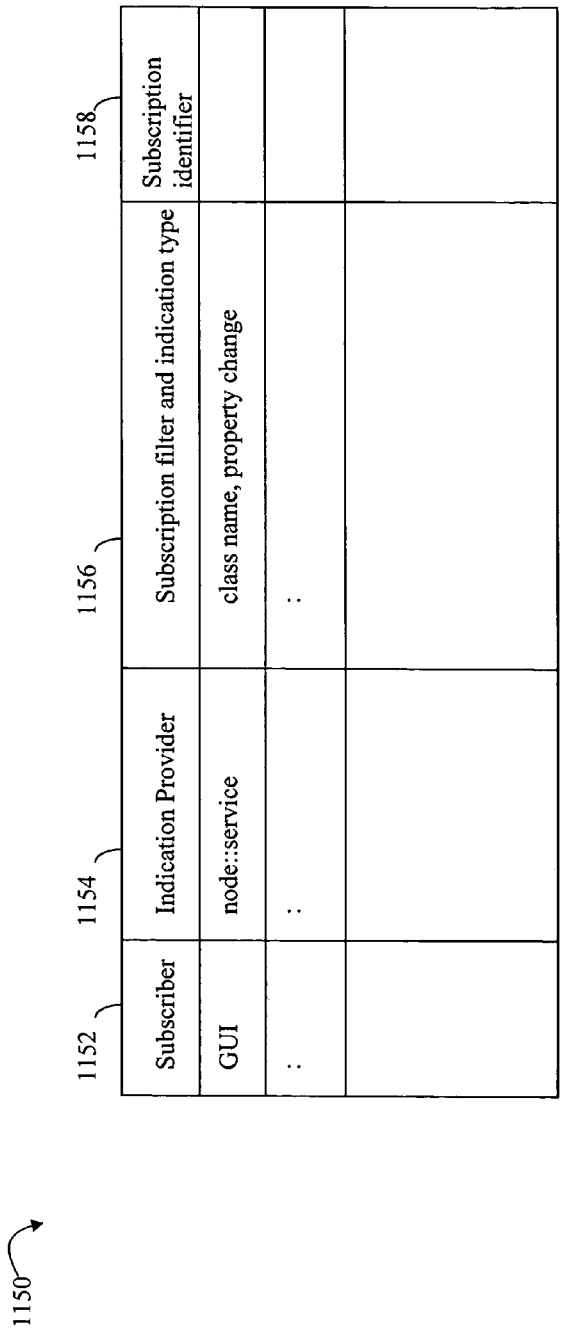

Referring now to FIG. 17, shown is an example 1150 illustrating subscription information as may be stored by the indication manager of the management system and on each node. The example 1150 includes a row in the table for each subscription. Column 1152 indicates the particular component on a node or management system, such as the GUI 110, which is the subscriber. Column 1154 indicates the indication provider or service from which the indications are received. The foregoing may be denoted by node identifier and service or other component within the node providing the indications. Column 1156 includes information describing the subscription filter and indication type. Column 1156 sets forth details about which indications are of interest to the subscriber. The subscription filter information may indicate, for example, which properties of an object, class, and the like, are of interest. The particulars of the indication provider and subscription information vary with each subscription request. Column 1158 include a subscription identifier associated with the subscription request. The subscription identifier may be used in connection with any resubscription requests in order to facilitate forwarding of any previously undeliverable messages associated with an original subscription request.

Figure 18:
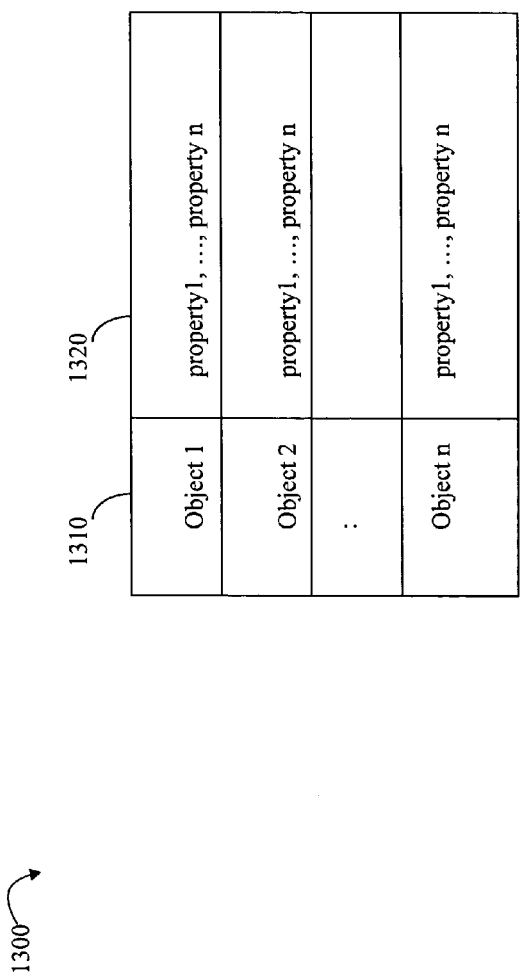

Referring now to FIG. 18, shown is an example of table of object information. The table 1300 includes an entry for each object defined in at a node. The table 1300 is a representation of the information on objects as may be stored in the object database of each node. The object identifier is indicated in column 1310 with the particular properties for the object included in column 1320 of the same row.

Figure 19:
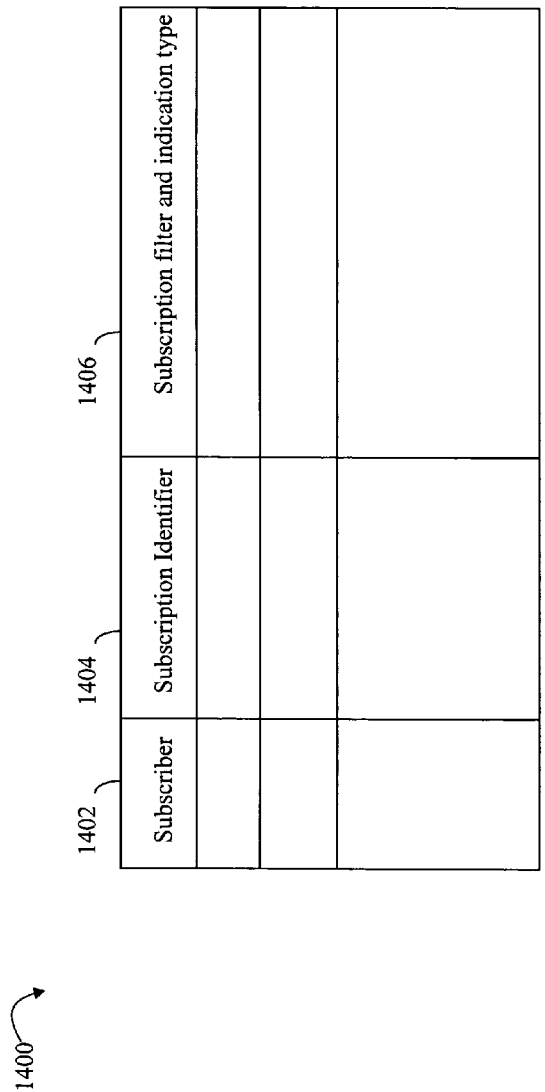

Referring now to FIG. 19, shown is an example of an embodiment of a table that may be used by a service in maintaining a list of subscribers to whom indications are sent. Column 1402 identifies the subscriber. It should be noted that 1402 may include node information, such as an IP address, as well as a service designation if the subscriber is remotely location with respect to the service. Column 1404 includes a subscription identifier as included in a subscription request message. Such information in column 1404 may be used in connection with resubscriptions to forward any previously undeliverable messages. Column 1406 includes the subscription and filter information as described in 1156 of FIG. 17.

The node in a domain selected as the indication consolidator may be selected using any one of a variety of different techniques in an embodiment such as, for example, random selection, in accordance with one or more heuristics related to the particular load or performance of a node, and the like. For example, if indication forwarding is used with the communication structure or tree of FIG. 3, the node in the domain selected as the indication consolidator may be any node in the domain since all nodes have connectivity to all other nodes in the domain. In the event the alternate technique (e.g., illustrated in FIG. 4) is used when not all nodes have connectivity to all other nodes, the node selected may have connectivity to all other nodes.

It should be noted that in one embodiment, communications between nodes of the domain and between the management system and nodes in the domain may utilize the COM (Common Information Management) protocol over connections utilizing TCP/IP. The requests and responses communicated therebetween may be written in XML (Extensible Mark-up Language). It will be appreciated by those skilled in the art that other protocols, formats and languages may be used in connection with implementation of the techniques described herein.

Using the foregoing provides a distributed approach which is scalable for use with a varying number of nodes. The foregoing techniques provide for a robust system with failover processing at each node on two levels. The first is within each node by utilizing dual processors at each node in which a second processor takes over task of the node in the event a currently active processor fails. The second is by providing processing in which a parent node selects an alternate replacement node for a failed child node.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for performing indication forwarding comprising:
   receiving, at an indication consolidator, a subscription request from a client to receive indications about a plurality of nodes in accordance with first filter information;
   determining a communication structure for forwarding indications, said communication structure including said plurality of nodes corresponding to entities forwarding indications to a said indication consolidator node;
   forwarding subscription requests including said first filter information from said indication consolidator to others of said plurality of nodes to establish communication connections between said plurality of nodes in accordance with said communication structure;
   forwarding, using said communication connections, indications fired from any of said plurality of nodes in accordance with said first filter information to said indication consolidator node; and
   notifying said client of any indications received at said indication consolidator node in accordance with said first filter information.

2. The method of claim 1, wherein each node includes a plurality of processors, and the method further includes performing for each node:
   designating a first of said plurality of processors to be an active processor and the remaining of said plurality of processors being designated as inactive; and if the active processor becomes unavailable and another of said plurality of processors is available, selecting said another of said plurality of processors as said active processor for said each node.

3. The method of claim 2, wherein said communication structure forms a tree in which each parent node subscribes to indications from its children.

4. The method of claim 3, wherein, if a node other than said indication consolidator node is determined as a failing node, a replacement node is determined by selecting one of the children, if any, of the failing node.

5. The method of claim 4, wherein said communication structure is adjusted so that any remaining children of said failed node are children of said replacement node.

6. The method of claim 5, further comprising:
adjusting subscriptions for indications so that said children of said failed node fire indications to said selected node.

7. The method of claim 3, wherein each parent node performs lightweight polling of its children at predefined time intervals to determine if it has connectivity over a communication connection with each of its children.

8. The method of claim 7, wherein if said parent node determines that an active processor of its child becomes unavailable and another of said plurality of processors is available, said parent node selects another of said plurality of processors as said active processor for said child node.

9. The method of claim 7, wherein each node forwards indications from any of its descendant nodes to a parent of said each node in accordance with said communication structure.

10. The method of claim 1, wherein if said client determines that said indication consolidator node is unavailable, the method further comprising:
selecting another one of said plurality of nodes as a new indication consolidator node; and
forwarding any previously undeliverable indications designated for said indication consolidator node to said new indication consolidator node.

11. The method of claim 1, wherein said indications correspond to one or more of events, a metric associated with an entity on a node, a property associated with an entity on a node, and an alert.

12. The method of claim 1, wherein each node performs event reporting about events on said each node in accordance with a same filter used by others of said plurality of nodes.

13. A computer readable medium comprising code stored thereon for performing indication forwarding, the computer readable medium comprising code that:
receives, at an indication consolidator, a subscription request from a client to receive indications about a plurality of nodes in accordance with first filter information;
determines a communication structure for forwarding indications, said communication structure including said plurality of nodes corresponding to entities forwarding indications to a said indication consolidator node;
forwards subscription requests including said first filter information from said indication consolidator to others of said plurality of nodes to establish communication connections between said plurality of nodes in accordance with said communication structure;
forwards, using said communication connections, indications fired from any of said plurality of nodes in accordance with said first filter information to said indication consolidator node; and
notifies said client of any indications received at said indication consolidator node in accordance with said first filter information.

14. The computer readable medium of claim 13, wherein each node includes a plurality of processors, and the computer readable medium further includes code for performing the following for each node:
designating a first of said plurality of processors to be an active processor and the remaining of said plurality of processors being designated as inactive; and
if the active processor becomes unavailable and another of said plurality of processors is available, selecting said another of said plurality of processors as said active processor for said each node.

15. The computer readable medium of claim 14, wherein said communication structure forms a tree in which each parent node subscribes to indications from its children.

16. The computer readable medium of claim 15, wherein, if a node other than said indication consolidator node is determined as a failing node, a replacement node is determined by selecting one of the children, if any, of the failing node.

17. The computer readable medium of claim 16, wherein said communication structure is adjusted so that any remaining children of said failed node are children of said replacement node, and the computer readable medium further includes code that:
adjusts subscriptions for indications so that said children of said failed node fire indications to said selected node.

18. The computer readable medium of claim 15, wherein each parent node includes code that performs lightweight polling of its children at predefined time intervals to determine if it has connectivity over a communication connection with each of its children.

19. The computer readable medium of claim 18, wherein if said parent node determines that an active processor of its child becomes unavailable and another of said plurality of processors is available, said parent node selects another of said plurality of processors as said active processor for said child node.

20. The computer readable medium of claim 13, further comprising code that, if said client determines that said indication consolidator node is unavailable:
selects another one of said plurality of nodes as a new indication consolidator node; and
forwards any previously undeliverable indications designated for said indication consolidator node to said new indication consolidator node.

* * * * *

UNITED STATES PATENT AND TRADEMARK OFFICE
CERTIFICATE OF CORRECTION

| | | |
|---|---|---|
| PATENT NO. | : 7,664,125 B1 | Page 1 of 1 |
| APPLICATION NO. | : 11/324740 | |
| DATED | : February 16, 2010 | |
| INVENTOR(S) | : Bauer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1075 days.

Signed and Sealed this

Thirtieth Day of November, 2010

David J. Kappos
*Director of the United States Patent and Trademark Office*